(12) United States Patent
Ahmed et al.

(10) Patent No.: US 9,726,553 B2
(45) Date of Patent: Aug. 8, 2017

(54) OPTICAL TEMPERATURE SENSOR AND USE OF SAME

(71) Applicant: NATIONAL INSTITUTE OF STANDARDS AND TECHNOLOGY, Gaithersbrug, MD (US)

(72) Inventors: Zeeshan Ahmed, Annandale, VA (US); Steve Semancik, Gaithersburg, MD (US); Jacob M Taylor, Washington, DC (US); Jingyun Fan, Rockville, MD (US); Mohammad Hafezi, Washington, DC (US); Haitan Xu, College Park, MD (US); Gregory Strouse, Frederick, MD (US)

(73) Assignee: The United States of America, as Represented by the Secretary of Commerce, Washington, DC (US)

( * ) Notice: Subject to any disclaimer, the term of this patent is extended or adjusted under 35 U.S.C. 154(b) by 416 days.

(21) Appl. No.: 14/301,921

(22) Filed: Jun. 11, 2014

(65) Prior Publication Data

US 2014/0321502 A1  Oct. 30, 2014

Related U.S. Application Data

(60) Provisional application No. 61/833,567, filed on Jun. 11, 2013.

(51) Int. Cl.
| | |
|---|---|
| *G01J 5/08* | (2006.01) |
| *G01J 5/44* | (2006.01) |
| *G01K 11/00* | (2006.01) |

(52) U.S. Cl.
CPC ..................... *G01K 11/00* (2013.01)

(58) Field of Classification Search
CPC ....... G01K 11/26; G01N 21/7746; G01J 5/08; G01J 5/0818; G01J 5/44
See application file for complete search history.

(56) References Cited

U.S. PATENT DOCUMENTS 4,775,214 A * 10/1988 Johnson ................. G01D 5/344
                                                                250/227.18
4,933,545 A *  6/1990 Saaski ................... G01L 9/0079
                                                                250/227.14
(Continued)

OTHER PUBLICATIONS

Optics Express, vol. 18, pp. 22216-22221.
(Continued)

*Primary Examiner* — Gail Kaplan Verbitsky
(74) *Attorney, Agent, or Firm* — Toby D. Hain

(57) ABSTRACT

A thermometer includes a substrate; an optical resonator disposed on the substrate and including an optical resonance, the optical resonator being configured to receive a resonant frequency corresponding to the optical resonance; and a waveguide disposed on the substrate proximate to the optical resonator to receive input light, to communicate the resonant frequency to the optical resonator, and to transmit output light; wherein an aperture is interposed between: the substrate and the optical resonator, the substrate and the waveguide, or a combination comprising at least one of the foregoing, and the thermometer is configured to change the optical resonance in response to a change in temperature of the optical resonator.

17 Claims, 20 Drawing Sheets

(56) References Cited

U.S. PATENT DOCUMENTS

| | | | | |
|---|---|---|---|---|
| 6,160,824 | A * | 12/2000 | Meissner | H01S 3/0632 372/10 |
| 7,356,221 | B2 * | 4/2008 | Chu | G02B 6/12007 385/16 |
| 7,820,970 | B1 * | 10/2010 | Shaw | G01J 5/08 250/338.1 |
| 7,983,517 | B1 | 7/2011 | Watts et al. | |
| 8,644,657 | B2 | 2/2014 | Park et al. | |
| 2002/0146047 | A1 * | 10/2002 | Bendett | C03C 4/00 372/40 |
| 2004/0145426 | A1 * | 7/2004 | Wu | H01P 5/082 333/26 |
| 2005/0030132 | A1 * | 2/2005 | Shamsaifar | H01P 1/2084 333/209 |
| 2006/0061438 | A1 * | 3/2006 | Toncich | H01P 1/20336 333/205 |
| 2006/0067605 | A1 * | 3/2006 | Mirkarimi | B82Y 20/00 385/12 |
| 2007/0258677 | A1 * | 11/2007 | Chigrinov | G02B 6/12007 385/15 |
| 2008/0285617 | A1 * | 11/2008 | Moldover | G01K 7/32 374/117 |
| 2009/0314763 | A1 * | 12/2009 | Chu | G02B 6/12007 219/476 |
| 2014/0126601 | A1 * | 5/2014 | Jeong | H01S 5/1032 372/50.11 |
| 2014/0283601 | A1 * | 9/2014 | Bhave | G01P 15/093 73/504.12 |
| 2015/0016767 | A1 * | 1/2015 | Akiyama | H01S 5/142 385/3 |
| 2015/0132015 | A1 * | 5/2015 | Hayakawa | G02F 1/025 398/200 |
| 2016/0091738 | A1 * | 3/2016 | Taylor | G02B 6/12007 385/2 |

OTHER PUBLICATIONS

Kim et al., "Silicon photonic temperature sensor employing a ring resonator manufactured using a standard CMOS process," Optics Express, Oct. 11, 2010, vol. 18 No. 21, pp. 22215-22221.

* cited by examiner

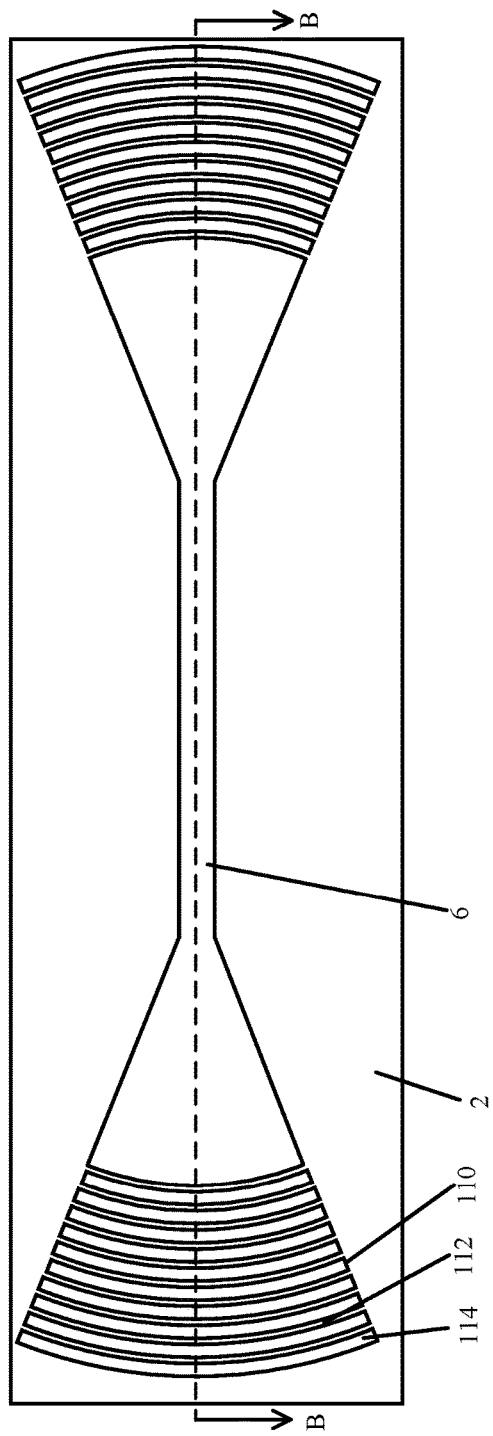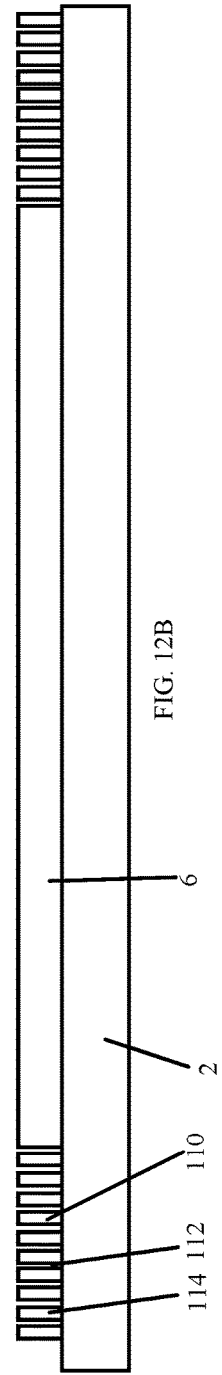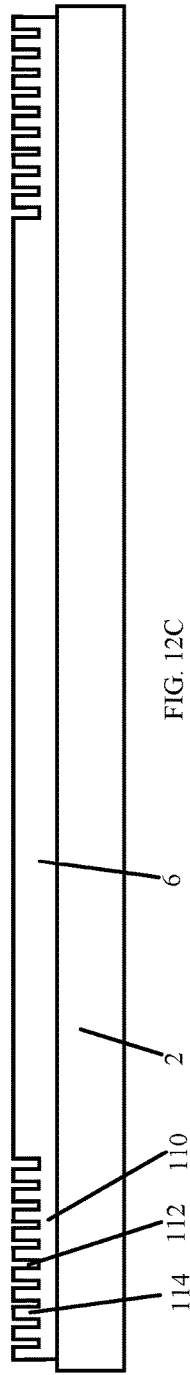
FIG. 12A
FIG. 12B
FIG. 12C

OPTICAL TEMPERATURE SENSOR AND USE OF SAME

CROSS REFERENCE TO RELATED APPLICATIONS

This application claims the benefit of U.S. Provisional Patent Application Ser. No. 61/833,567 filed Jun. 11, 2013, the disclosure of which is incorporated herein by reference in its entirety.

STATEMENT REGARDING FEDERALLY SPONSORED RESEARCH

This invention was made with United States government support from the National Institute of Standards and Technology. The government has certain rights in the invention.

BACKGROUND

Temperature measurements play a central role in numerous areas such as controlling processes in manufacturing, monitoring physiology, and controlling and monitoring environmental conditions in buildings, automobiles, and outdoors. Despite the ubiquity of thermometers, the underlying technology has been slow to advance over the last century. For example, the standard platinum resistance thermometer was developed over a century ago and has undergone limited modifications. Many modern temperature sensors rely on a resistance measurement involving a thin metal film or wire. However, such resistance thermometers are sensitive to mechanical shock that results in a drift in a resistance that requires recalibration of the instrument.

Accordingly, advances in methods and equipment for thermometry would be advantageous and received favorably in the art.

BRIEF DESCRIPTION

The above and other deficiencies are overcome by, in an embodiment, a thermometer comprising: a substrate; an optical resonator disposed on the substrate and comprising an optical resonance, the optical resonator being configured to receive a resonant frequency corresponding to the optical resonance; and a waveguide disposed on the substrate proximate to the optical resonator to receive input light, to communicate the resonant frequency to the optical resonator, and to transmit output light; wherein an aperture is interposed between: the substrate and the optical resonator, the substrate and the waveguide, or a combination comprising at least one of the foregoing, and the thermometer is configured to change the optical resonance in response to a change in temperature of the ring resonator.

Further disclosed is a thermometer comprising: a substrate; and a waveguide disposed on the substrate to receive input light and to transmit output light, wherein an aperture is interposed between the substrate and the waveguide, and the waveguide is configured to change an intensity of the output light at a wavelength in response to a change of a temperature of the waveguide.

Additionally disclosed is a process for determining a thermal property, the process comprising: providing a thermometer comprising: a substrate; an optical resonator disposed on the substrate and comprising an optical resonance; and a waveguide disposed on the substrate proximate to the optical resonator; subjecting the optical resonator to a first temperature; receiving, by the waveguide, an input light comprising a wavelength having a first transmission intensity through the waveguide at the first temperature; receiving, by the optical resonator from the waveguide, a first amount of the wavelength at the first temperature; subjecting the optical resonator to a second temperature; receiving, by the optical resonator from the waveguide, a second amount of the wavelength at the second temperature; changing the first transmission intensity to a second transmission intensity corresponding to the second amount; and analyzing the first transmission intensity and the second transmission intensity to determine the first temperature, the second temperature, a difference between the first temperature and the second temperature, or a combination comprising at least one of the foregoing to determine the thermal property.

BRIEF DESCRIPTION OF THE DRAWINGS

The following descriptions should not be considered limiting in any way. With reference to the accompanying drawings, like elements are numbered alike:

FIGS. 12A, 12B, and 12C show a waveguide including a Bragg grating;

DETAILED DESCRIPTION

A detailed description of one or more embodiments is presented herein by way of exemplification and not limitation.

It has been found that a thermometer herein is highly sensitive and resistant to change in response due to a physical impact. Moreover, the thermometer is useful as self-calibrating or self-diagnosing thermometer. The thermometer has an integrated optical resonator with a resonant frequency that changes with temperature due to thermal expansion or a thermo-optic effect of the optical resonator. The thermometer can include a thermal member to provide a selected temperature change to the optical resonator. Advantageously, the thermometer is to calibrate or determine a performance of an article, e.g., remotely. Further, the thermometer has a robust physical construction and is small, yet scalable. The thermometer also is rugged, does not require frequent, expensive, time-consuming re-calibration, and has a small thermal mass that does not rely upon voltage measurement for temperature determination. The thermometer can be fabricated in bulk quantities in a mass production environment. Beneficially, the thermometer involved temperature dependent light transmission and is resistant to electromagnetic interference. Additionally, the thermometer is deployable in harsh environments and supplants calibration of on-board temperature sensors.

Figure 1A:
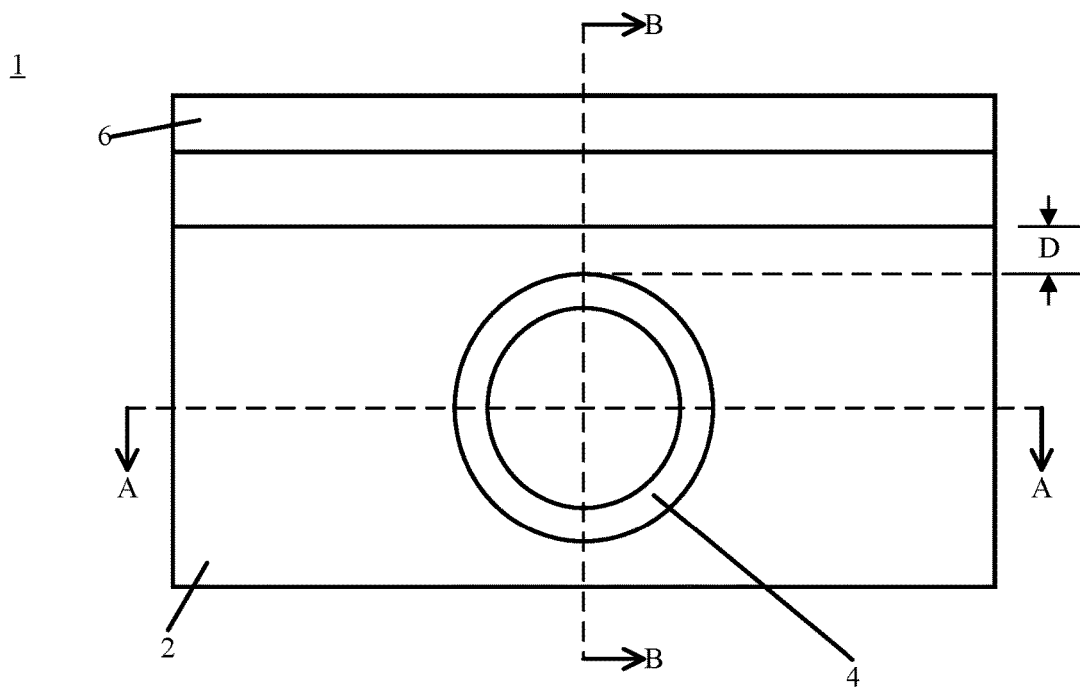
FIGS. 1A, 1B, and 1C show a thermometer.
Figure 1B:
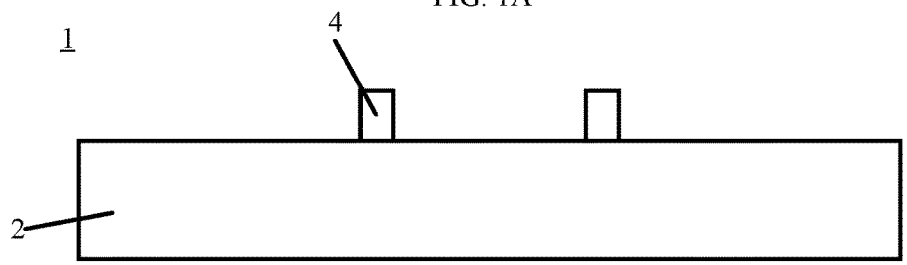

With reference to FIGS. 1A (top view of thermometer 1), 1B (cross-section along line A-A of FIG. 1A), and 1C (cross-section along line B-B in FIG. 1A), in an embodiment, thermometer 1 includes optical resonator 4 (e.g., a ring resonator) disposed on substrate 2. Waveguide 6 is disposed on substrate 2 proximate to optical resonator 4. Optical resonator 4 has an optical resonance and is configured to receive a resonant frequency corresponding to the optical resonance. Waveguide 6 is configured to receive input light, to communicate the resonant frequency to optical resonator 4, and to transmit output light. Thermometer 1 is configured to change the optical resonance in response to a change in temperature of optical resonator 4. Distance D separates optical resonator 4 and waveguide 6. Optical resonator 4 has outer diameter OD, inner diameter ID, thickness H1, and width W1. Waveguide 6 has thickness H2 and width W2.

Figure 2A:
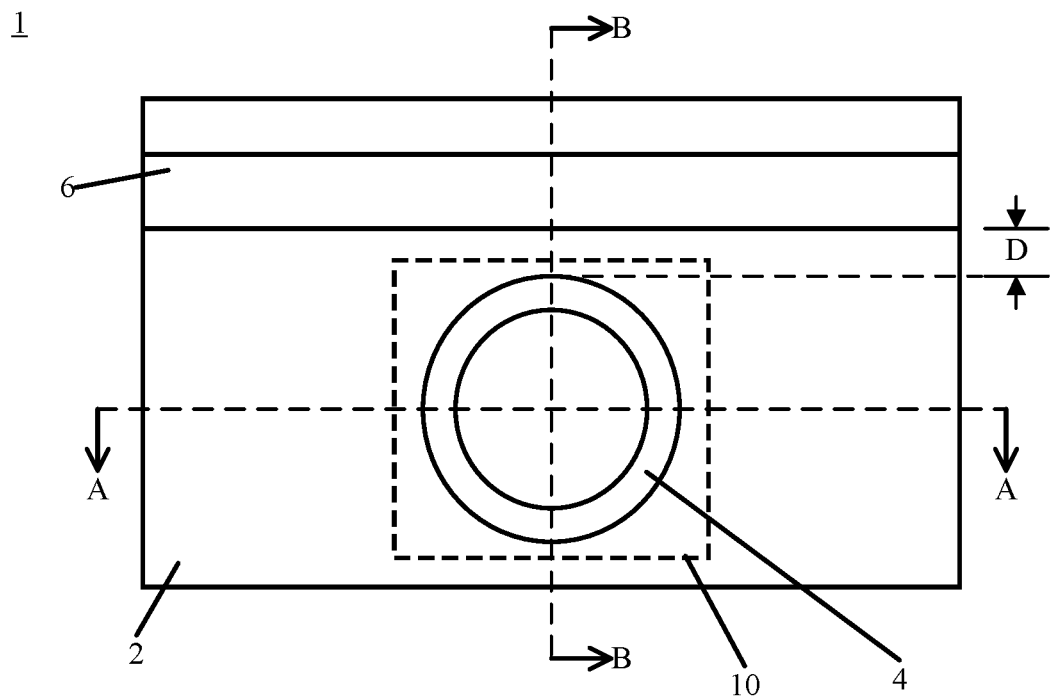
FIGS. 2A, 2B, and 2C show a thermometer including a heater disposed on a substrate.
Figure 2B:
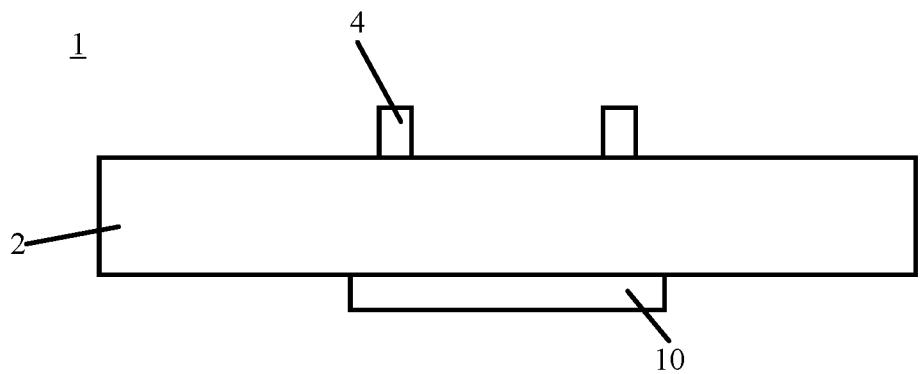
Figure 2C:
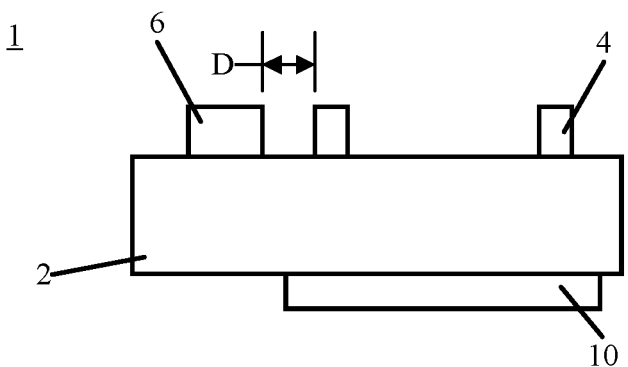
Figure 3A:
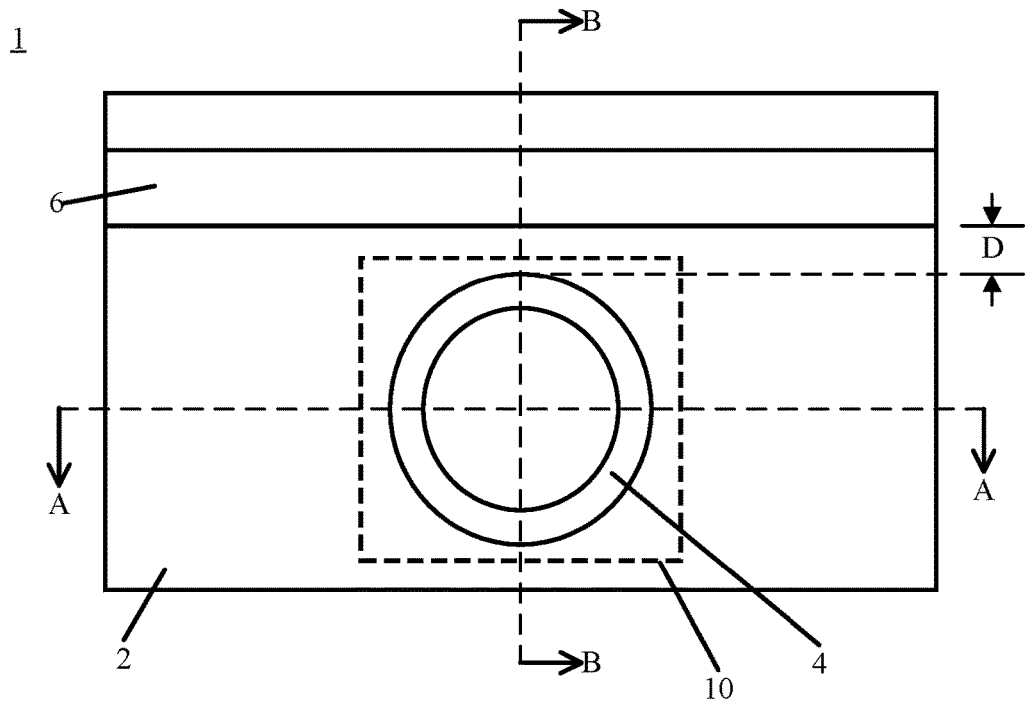
FIGS. 3A, 3B, and 3C show a thermometer including a heater disposed in a substrate.
Figure 3B:
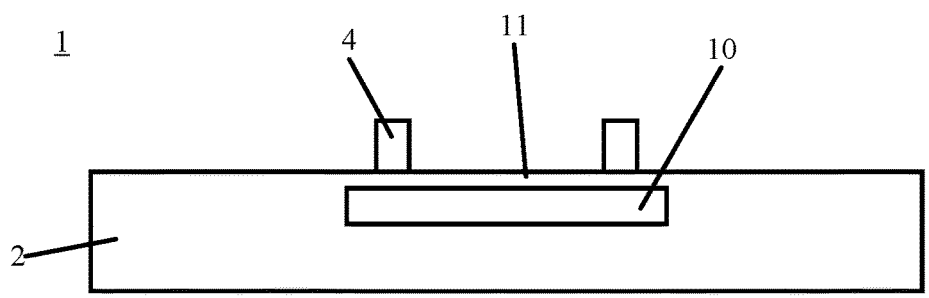
Figure 3C:
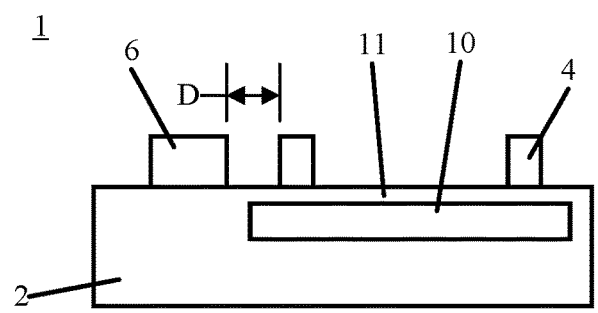

According to an embodiment shown in FIGS. 2A (top view of thermometer 1), 2B (cross-section along line A-A of FIG. 2A), and 2C (cross-section along line B-B in FIG. 2A), thermometer 1 includes thermal member 10 disposed on substrate 2 opposing optical resonator 4. According to an embodiment shown in FIGS. 3A (top view of thermometer 1), 3B (cross-section along line A-A of FIG. 3A), and 3C (cross-section along line B-B in FIG. 3A), thermometer 1 includes thermal member 10 disposed in substrate 2 opposing optical resonator 4. Thermal member 10 is configured to change or maintain a temperature of optical resonator 4. In some embodiments, thermal member 10 increases a temperature of optical resonator 4. In an embodiment, thermal member 10 decreases a temperature of optical resonator 4

Here, cover layer 11 is interposed between thermal member 10 and optical resonator 4. Cover layer 11 can be made of a same or different material as substrate 2. In an embodiment, cover layer 11 includes a material that efficiently communicates thermal energy between thermal member 10 and optical resonator 4.

Figure 4A:
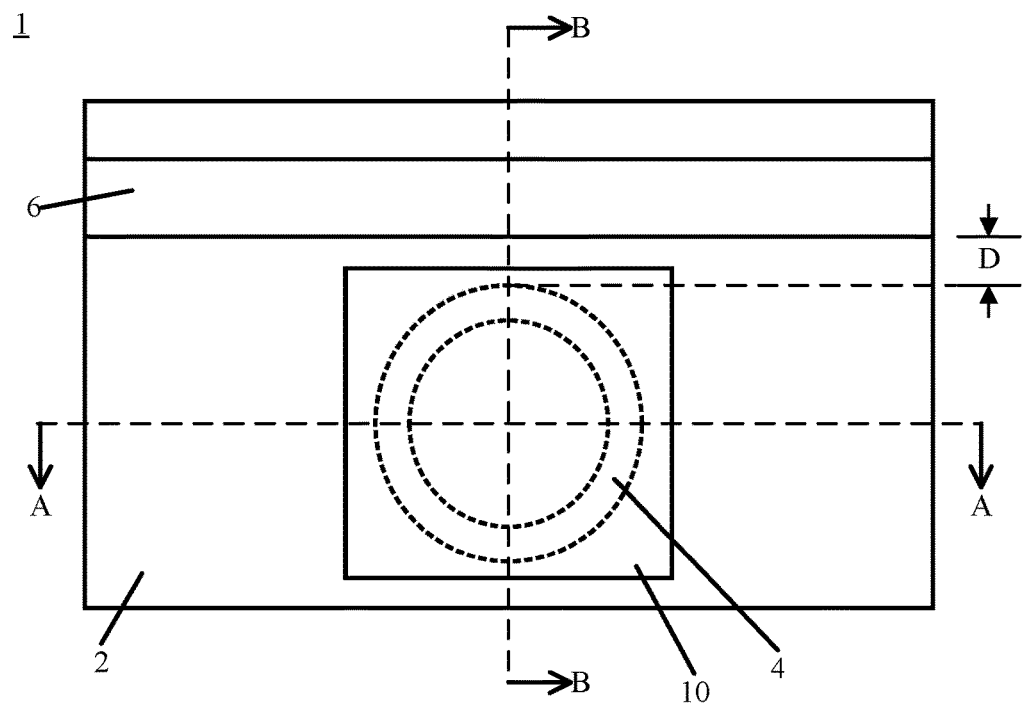
FIGS. 4A, 4B, and 4C show a thermometer including a heater disposed on an optical resonator.
Figure 4B:
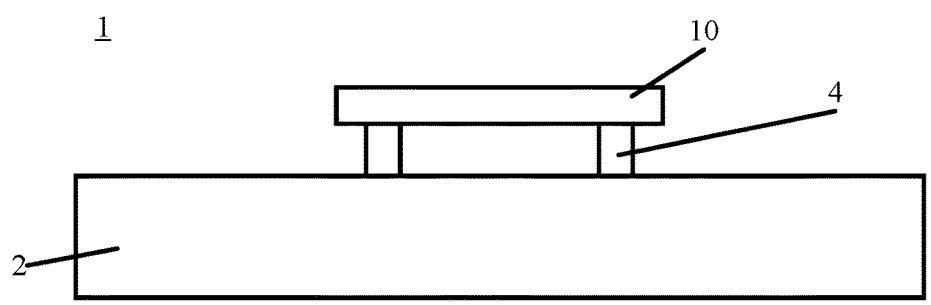
Figure 4C:
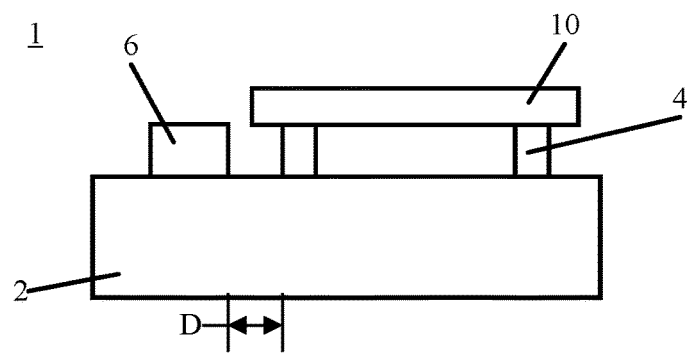

According to an embodiment shown in FIGS. 4A (top view of thermometer 1), 4B (cross-section along line A-A of FIG. 4A), and 4C (cross-section along line B-B in FIG. 4A), thermometer 1 includes thermal member 10 disposed on optical resonator 4 opposing substrate 2. A cover layer (not shown) can be interposed between optical resonator 4 and thermal member 10.

Figure 5A:
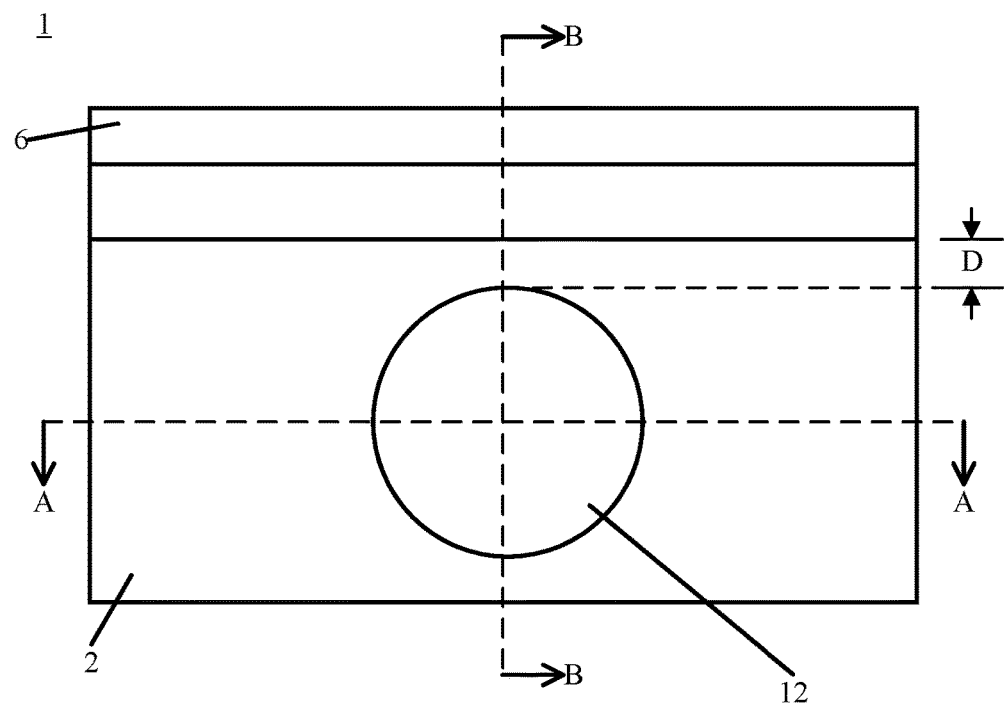
FIGS. 5A, 5B, and 5C show a thermometer.
Figure 5B:
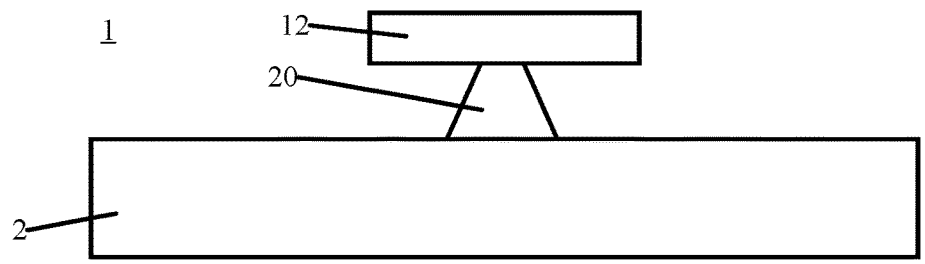
Figure 5C:
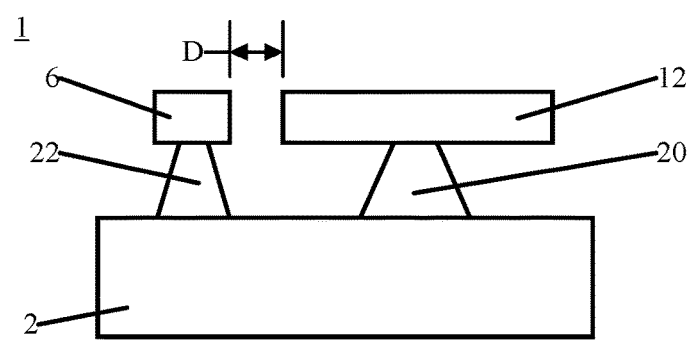

Besides ring resonator indicated as optical resonator 4, various other optical resonators can be used in the thermometer. In an embodiment, as shown in FIGS. 5A (top view of thermometer 1), 5B (cross-section along line A-A of FIG. 5A), and 5C (cross-section along line B-B in FIG. 5A), thermometer 1 includes first intermediate member 20 interposed between disk resonator 12 and substrate 2. Additionally, second intermediate member 22 is interposed between waveguide 6 and substrate 2. Although first intermediate member 20 and second intermediate member 22 are shown as having a frustoconical shape, first intermediate member 20 and second intermediate member 22 can have any shape (e.g., cylindrical, square, rectangular, ellipsoidal, parallelepiped, and the like) effective to separate substrate 2 from disk resonator 12 or waveguide 6.

Figure 6A:
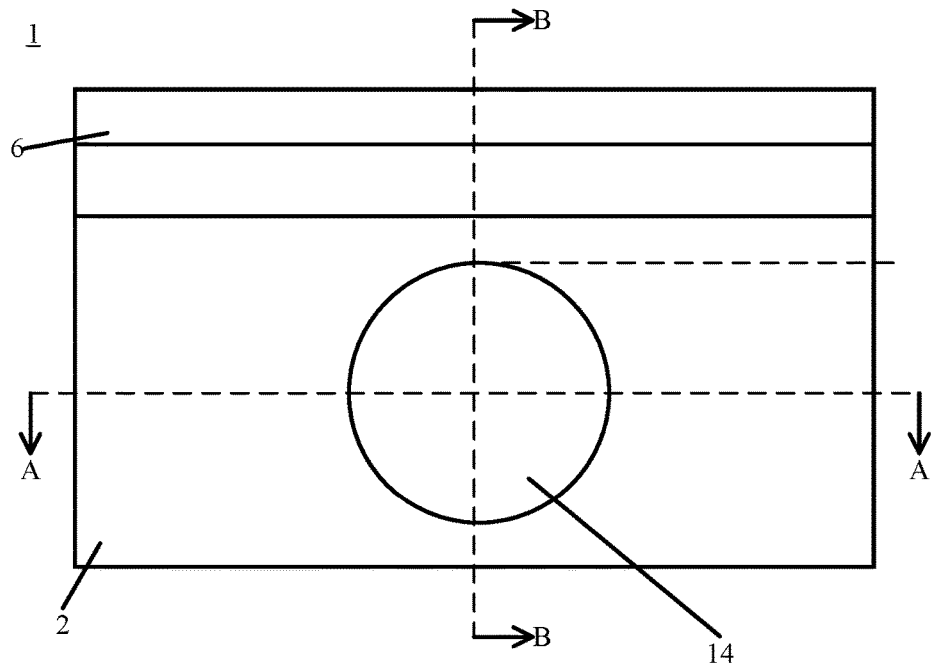
FIGS. 6A, 6B, and 6C show a thermometer including an optical resonator having a conical shape.
Figure 6B:
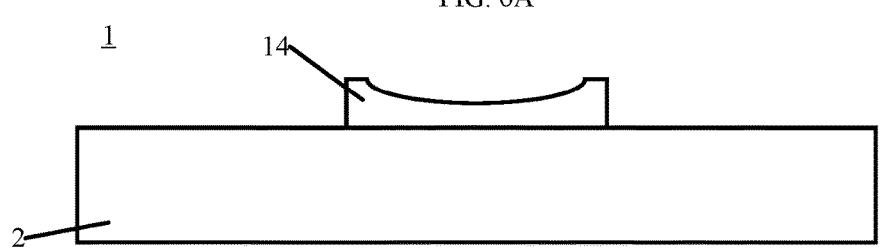
Figure 6C:
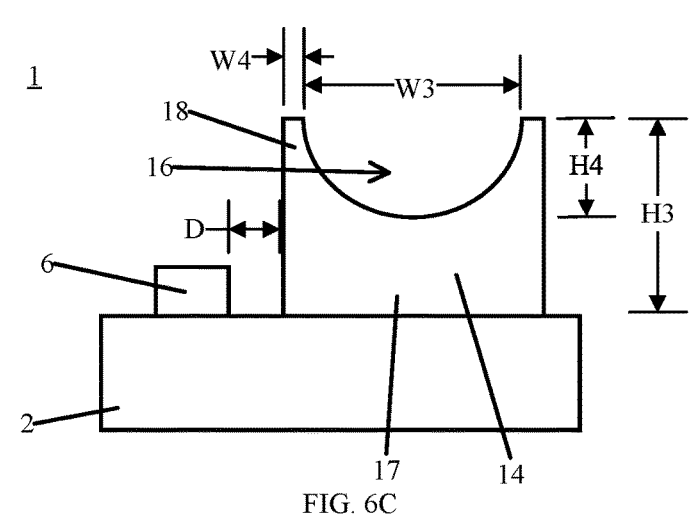

In one embodiment, as shown in FIGS. 6A (top view of thermometer 1), 6B (cross-section along line A-A of FIG. 6A), and 6C (cross-section along line B-B in FIG. 6A), thermometer 1 includes concave resonator 14 disposed on substrate 2. Concave resonator 14 includes base 17 proximately disposed to substrate 2, concave portion 16, and protuberance 18. Concave portion 16 has width W3 and depth H4, and protuberance 18 has width W4 at a top surface thereof. Thickness H3 is a thickness of concave resonator 14. Width W4 of protuberance 18 optionally can be absent in some embodiments.

Figure 7A:
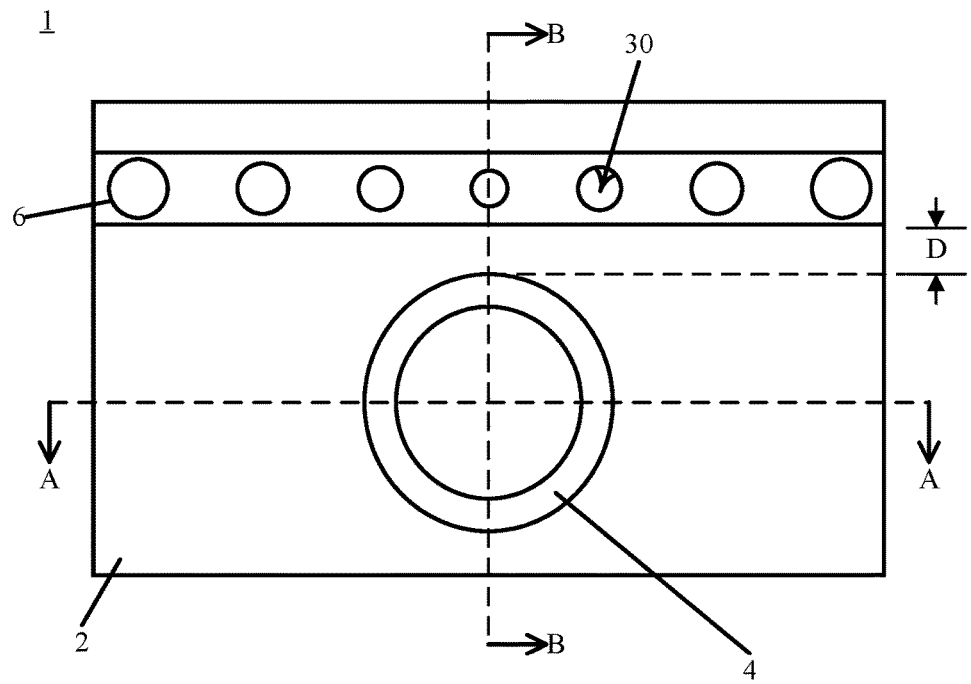
FIGS. 7A, 7B, and 7C show a thermometer including a waveguide having a plurality of apertures, and FIGS. 7D, 7E, and 7F respectively show a top view of the thermometer, a cross-section along line A-A of FIG. 7D, and a cross-section along line B-B in FIG. 7D.
Figure 7B:
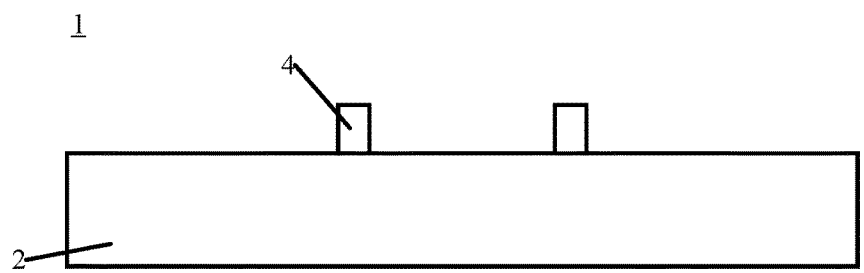
Figure 7C:
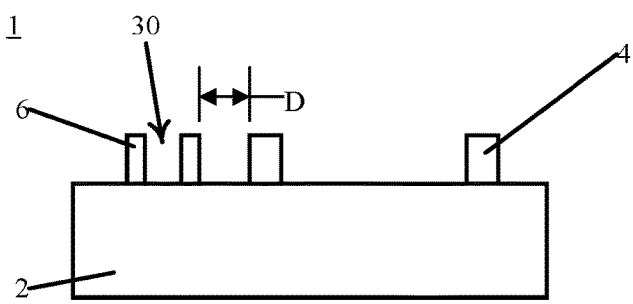

According to an embodiment, as shown in FIGS. 7A (top view of thermometer 1), 7B (cross-section along line A-A of FIG. 7A), and 7C (cross-section along line B-B in FIG. 7A), thermometer 1 includes waveguide 6 having an aperture 30 disposed therein. In some embodiments, a plurality of apertures 30 is distributed along a length axis of waveguide 6. In certain embodiments, the plurality of apertures 30 have a diameter of the same size. In an embodiment, some of the plurality of apertures 30 have different size diameters. According to one embodiment, the plurality of apertures 30 have different size diameters such that apertures 30 are arranged symmetrically with respect to optical resonator 4 with largest diameter apertures 30 located distal to optical resonator 4 and smallest diameter apertures 30 located proximate to optical resonator 4.

Figure 7D:
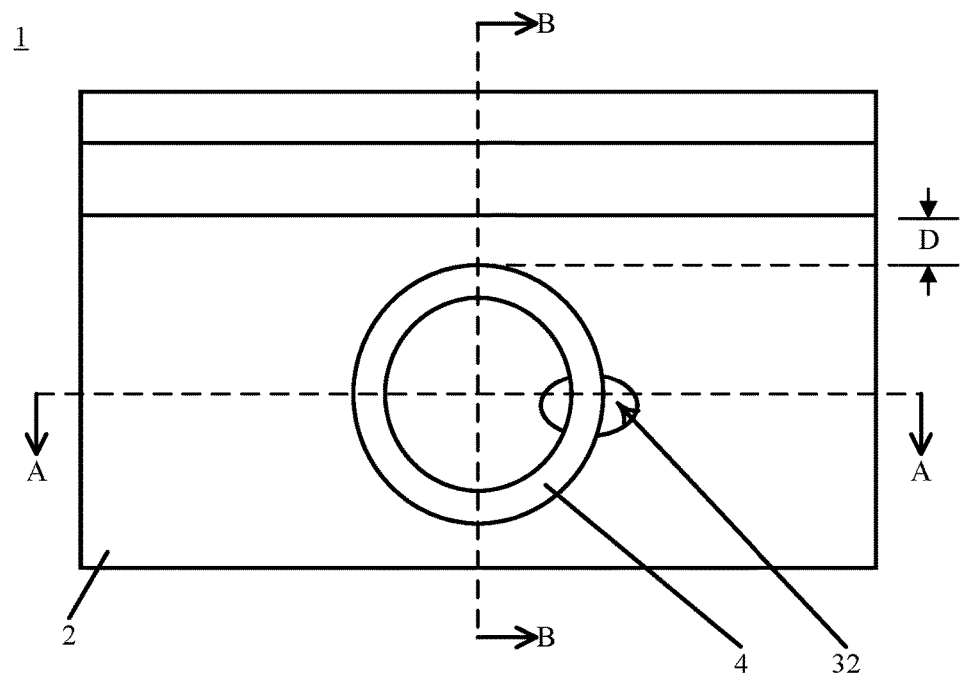
Figure 7E:
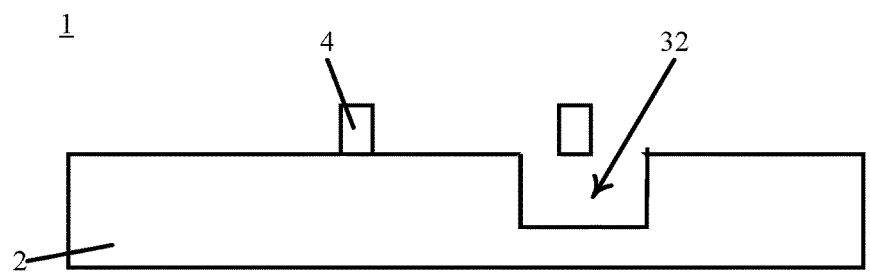
Figure 7F:
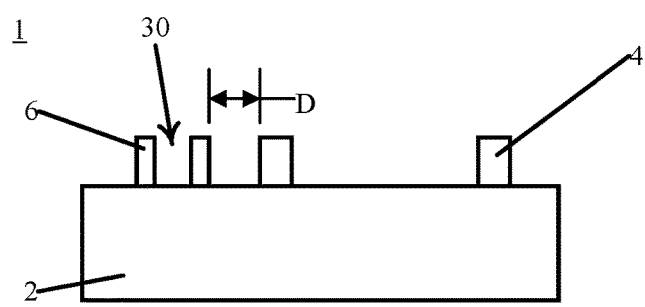

In an embodiment, as shown in FIGS. 7D (top view of thermometer 1), 7E (cross-section along line A-A of FIG. 7D), and 7F (cross-section along line B-B in FIG. 7D), thermometer 1 includes aperture 32 interposed between optical resonator 4 and substrate 2. Aperture 32 has a size in a dimension (e.g., depth, width, or height) effective to mechanically or optically decouple optical resonator 4 and substrate 2 such that optical resonator 4 and substrate 2 independently support a mechanical mode or an optical mode. In this manner, without wishing to be bound by theory, it is believed that a mechanical mode or an optical mode of optical resonator 4 is not quenched by substrate 4.

Figure 8A:
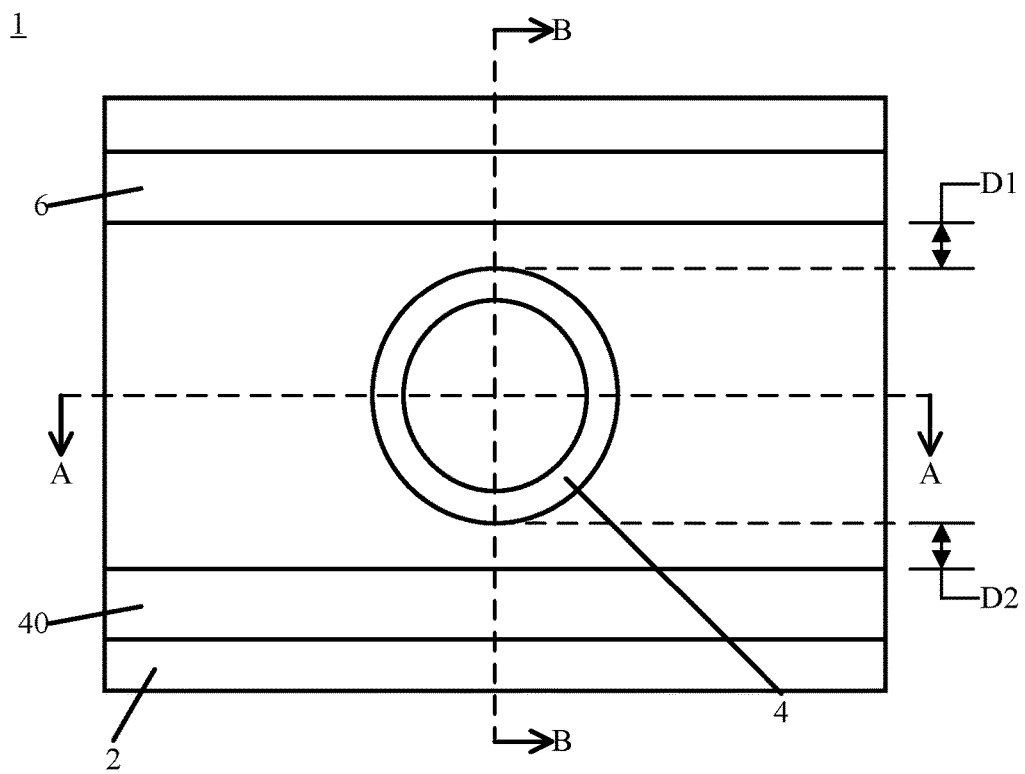
FIGS. 8A, 8B, and 8C show a thermometer including a plurality of waveguides.
Figure 8B:
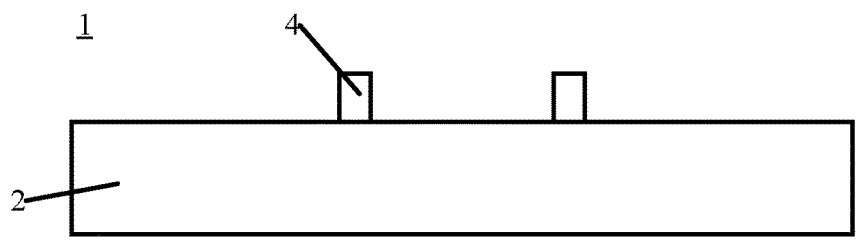
Figure 8C:
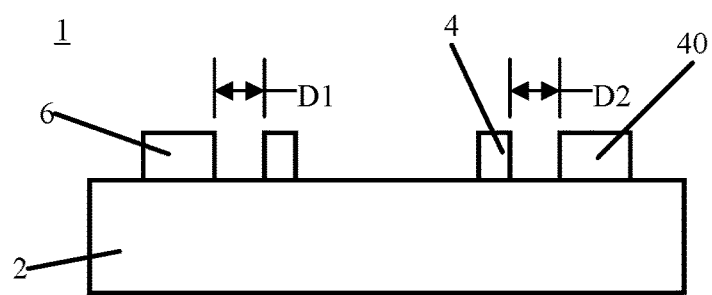

According to an embodiment, as shown in FIGS. 8A (top view of thermometer 1), 8B (cross-section along line A-A of FIG. 8A), and 8C (cross-section along line B-B in FIG. 8A), thermometer 1 includes auxiliary waveguide 40 disposed on substrate 2 opposing waveguide 6, wherein optical resonator 4 is interposed between waveguide 6 and auxiliary waveguide 40. Accordingly, thermometer 1 includes a drop-add arrangement of optical resonator 4.

Figure 9A:
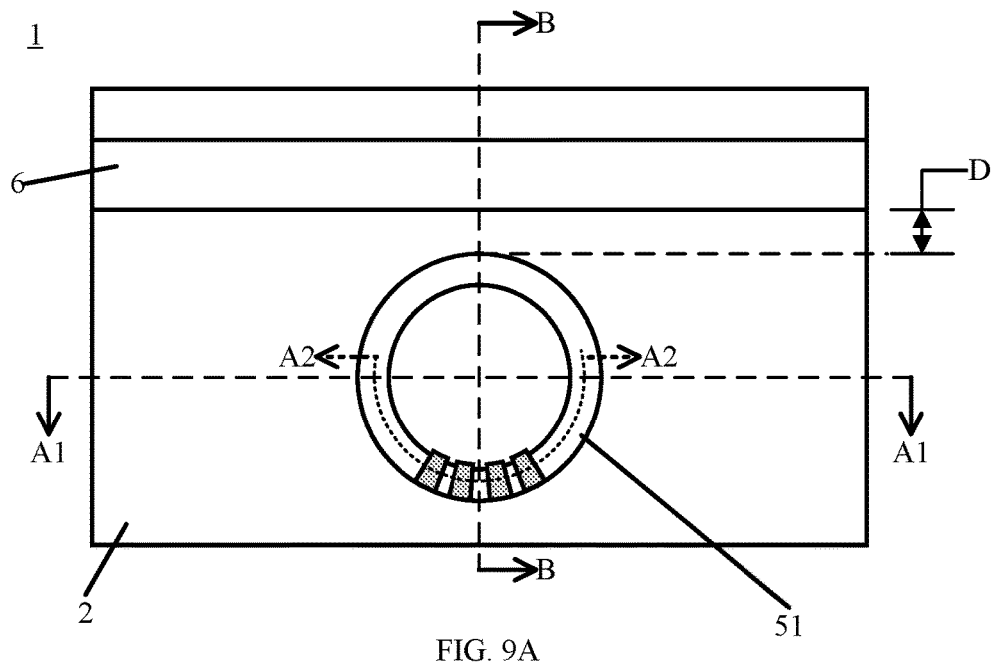
FIGS. 9A, 9B, 9C, and 9D show a thermometer including an optical resonator having a Bragg grating.
Figure 9B:
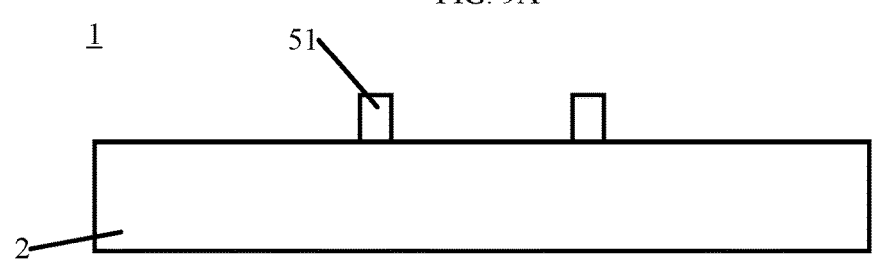

In an embodiment, as shown in FIGS. 9A (top view of thermometer 1), 9B (cross-section along line A1-A1 of FIG. 9A), and 9C (cross-section along line B-B in FIG. 9A), thermometer 1 includes optical resonator 51 (e.g., a ring resonator as shown) disposed on substrate 2 proximate to waveguide 6. Optical resonator 51 includes a Bragg grating 50 integrally disposed in optical resonator 51. Bragg grating 50 includes a plurality of regions having a different refractive index from each, e.g., alternating first region 52 (having a first index of refraction) and second region 54 (having a second refractive index). The first or second index of refraction can be the same or different as an index of refraction of a remainder of material of optical resonator 51.

Figure 9C:
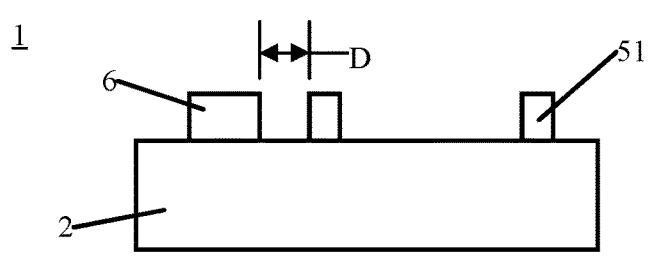
Figure 9D:
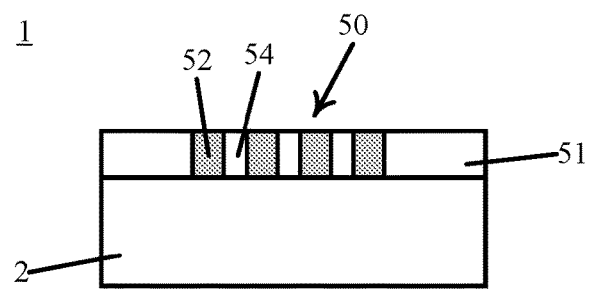

According to an embodiment, Bragg grating 50 is a periodic (as shown in FIG. 9D, which is a cross-section along line A2-A2 of FIG. 9a) or aperiodic perturbation of an effective index of refraction in optical resonator 51. In an embodiment, the perturbation causes reflection of light (propagating in optical resonator 51) for a wavelength of light that satisfies a Bragg condition. Light at other wavelengths that does not satisfy the Bragg condition is substantially unaffected by Bragg grating 50.

Figure 10A:
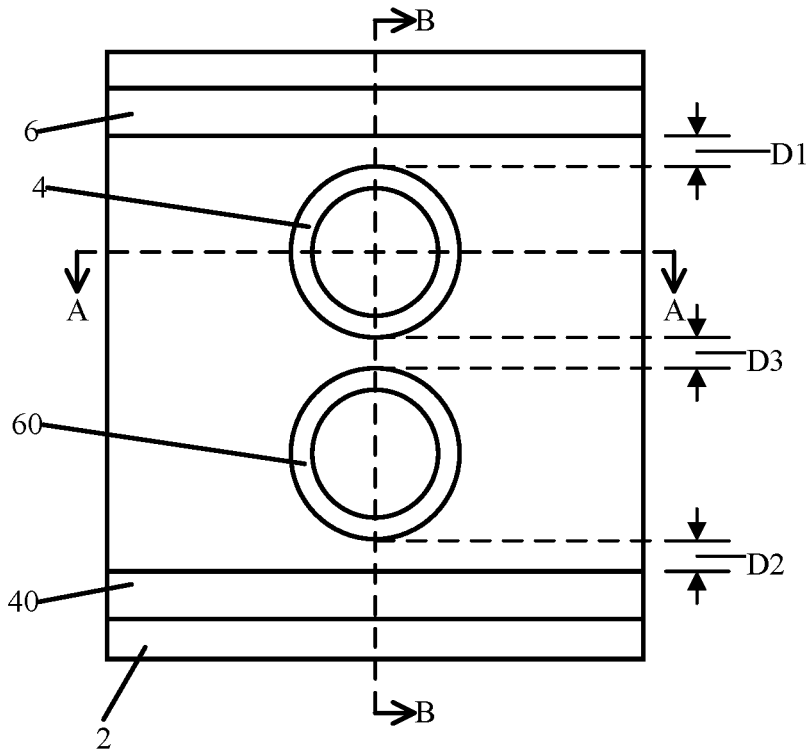
FIGS. 10A, 10B, and 10C show a thermometer including a plurality of optical resonators and a plurality of waveguides.
Figure 10B:
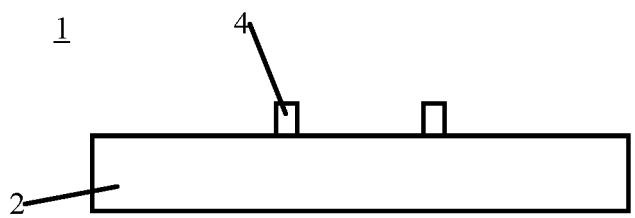
Figure 10C:
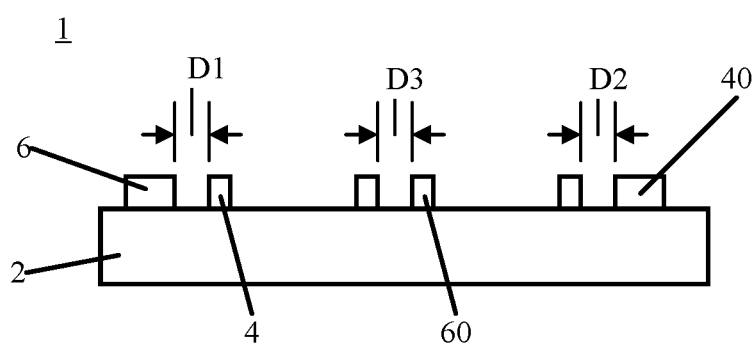

In some embodiments, as shown in FIGS. 10A (top view of thermometer 1), 10B (cross-section along line A-A of FIG. 10A), and 10C (cross-section along line B-B in FIG. 10A), thermometer 1 includes auxiliary optical resonator 60 (e.g., a ring resonator as shown) disposed on substrate 2 proximate to auxiliary waveguide 40 and spaced apart therefrom by distance D2. Distance D3 separates auxiliary optical resonator 60 and optical resonator 4. Although, two optical resonators (4, 60) are shown, some embodiments include a plurality of optical resonators coupled and interposed between waveguide 6 and auxiliary waveguide 40. In one embodiment, the plurality of optical resonators includes different types for optical resonators, e.g., a ring resonator, disk resonator, concave resonator, or a combination thereof. Such combination of coupled optical resonators (4, 60) provide a narrow bandwidth of frequencies communicated to auxiliary waveguide 40 from a broader band of frequencies transmitted by waveguide 6 via optical resonators (4, 60).

Figure 11A:
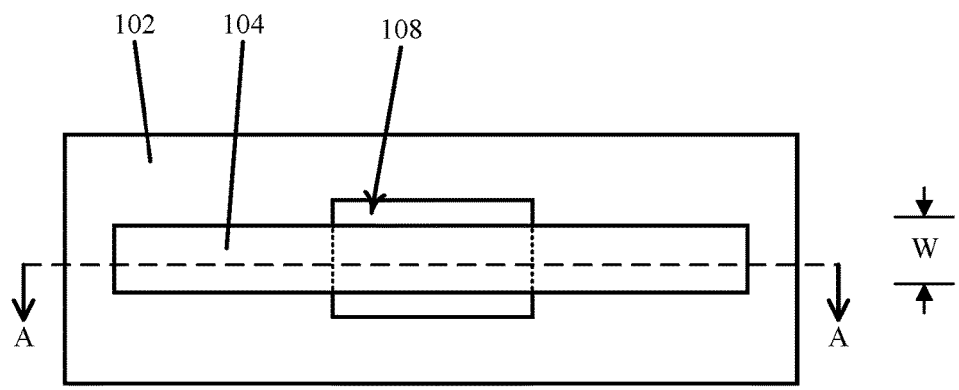
FIGS. 11A and 11B show a thermometer including waveguide.
Figure 11B:
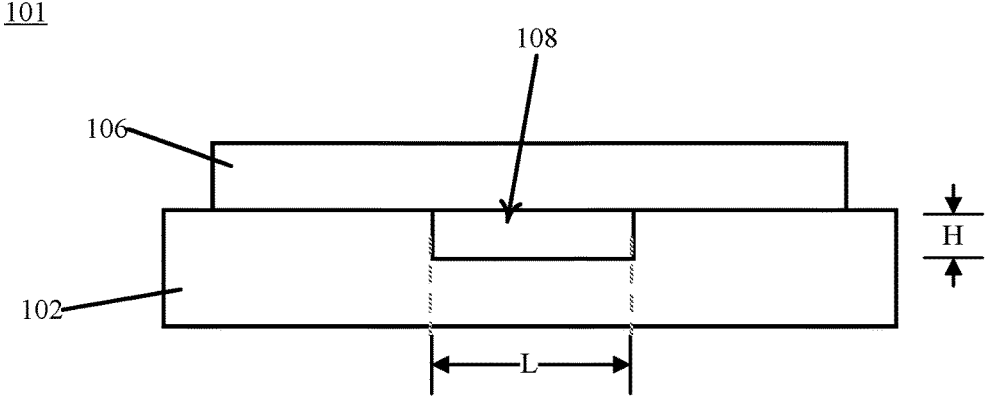

According to an embodiment, as shown in FIGS. 11A (top view of thermometer 101) and 10B (cross-section along line A-A of FIG. 11A), thermometer 101 includes waveguide 106 disposed on substrate 102. Aperture 108 is present in substrate 102 and is interposed between a portion of waveguide 106 and substrate 102. Aperture 108 has width W and thickness H, a dimension of each of which independently can be varied during formation to form various shapes (e.g., circular, square, polygonal, and the like) and aspect ratios of length L, width W, and thickness H. In some embodiments, waveguide 106 includes a Bragg grating 50 (see FIG. 9C) in a position proximate to aperture 108.

In some embodiments, the thermometer includes the substrate and the waveguide disposed on the substrate to receive input light and to transmit output light such that the aperture is interposed between the substrate and the waveguide. The waveguide is configured to change an intensity of the output light at a wavelength in response to a change of a temperature of the waveguide.

In an embodiment, the thermometer includes a substrate; an optical resonator disposed on the substrate and including an optical resonance. The optical resonator is configured to receive the resonant frequency corresponding to the optical resonance. The thermometer also includes a waveguide disposed on the substrate proximate to the optical resonator to receive input light, to communicate the resonant frequency to the optical resonator, and to transmit output light with an aperture is interposed between the substrate and the optical resonator, the substrate and the waveguide, or a combination comprising at least one of the foregoing. Further, the thermometer is configured to change the optical resonance in response to a change in temperature of the optical resonator.

Figure 1C:
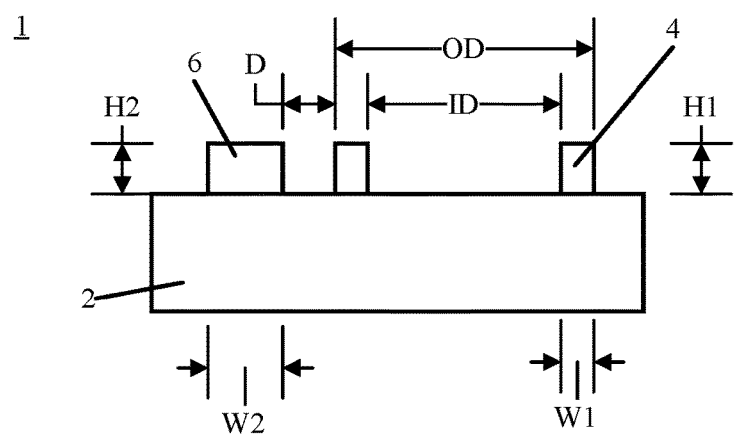

In some embodiments, the optical resonator includes a ring resonator, a concave disk resonator, a photonic waveguide, disk resonator, a microsphere resonator, a photonic array, or a combination comprising at least one of the foregoing. As such, the optical resonator can be a ring, disk, or spherical structure disposed at a selected distance from a waveguide. A radius of the optical resonator is selected so an effective length of a circumference is an integer of a resonant wavelength. In some embodiments, the optical resonator is the ring resonator that has a substantially uniform width with respect to a radial dimension of the ring resonator, e.g., substantially uniform width W1 between outer diameter OD and inner diameter ID as in FIG. 1C.

According to an embodiment, input light is coupled into the thermometer from a light source, coupled from the thermometer to a detector, or a combination thereof. In an embodiment, the waveguide comprises a Bragg coupler, an end coupler, or a combination comprising at least one of the foregoing disposed at a terminus of the waveguide. As shown in FIGS. 12A (top view of waveguide 6) or 12B (cross-section along line A-A of FIG. 12A), waveguide 6 includes Bragg coupler 110 disposed at a terminus thereof. Bragg coupler 110 includes a plurality of protrusions 112 and depressions 114 alternatingly disposed on substrate 2. With reference to FIG. 12C (an alternate embodiment for a Bragg coupler corresponding to a cross-section along line B-B in FIG. 12A), depressions 114 are blind with respect to substrate 2 relative to through features as shown in FIG. 12B. In one embodiment, depressions 114 include blind depressions 114, through depressions, or a combination thereof. Here, "through" refers to expose substrate 2 through depressions 114, and "blind" refers to covering substrate 2 by depressions 114 such that substrate 2 is not exposed. It is contemplated that a Bragg coupler uses a grating structure (e.g., protrusions 112 and depressions 114) to couple input light into the thermometer and to couple output light out of the thermometer. In an embodiment, coupling light by waveguide 6 is evanescent coupling via Bragg coupler 110.

Figure 13:
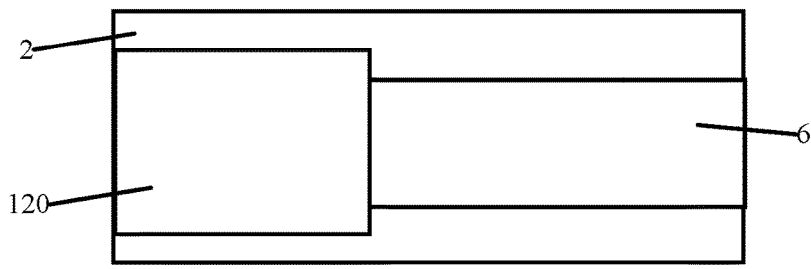
FIG. 13 shows a waveguide including an end coupler.

In an embodiment, as shown in FIG. 13, waveguide 6 includes edge coupler 120 disposed at a terminus of waveguide 6. Edge coupler 120 couples light in and out by, e.g., a pigtailed fiber optic, which is connected, e.g., adhered, to substrate 6.

Thermometer 1 includes substrate 2. Substrate 2 can include any material that can effectively be processed (e.g., micromachined, including lithography and the like) to form a support structure for optical resonator (e.g., 4), thermal member 10, waveguide (e.g., 6), or other components thereof.

In a particular embodiment, substrate 2 includes a semiconductor. An exemplary semiconductor is an element from group 11, 12, 13, 14, 15, or 16 (IUPAC nomenclature, which respectively is identical to group I, II, III, IV, V, or VI) of the periodic table such as a Si, Ga, Ge, As, In, Sn, Sb, Te, At, Hf, Zn, and the like, or a combination thereof. According to an embodiment, substrate 2 is a compound semiconductor such as SiC, SiGe, GaN; a group 13-15 (also referred to as a group III-V) semiconductor such as AlSb, AlAs, AlN, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a layer semiconductor such as $PbI_2$, $MoS_2$, GaSe, and the like; an oxide semiconductor such as CuO, $Cu_2O$, and the like; (Al,Ga)N, (Al,Ga)As, (In,Ga)As, (Al,Ga)Sb, (In,Ga)Sb, as well as nitride, arsenide, antimonide quaternary III-V alloys, or a combination comprising at least one of the foregoing. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al,Ga)Sb, and the like. Exemplary Group III-nitride alloys include (Ga,Al)N, (Ga,In)N, (Al,In)N, (Ga,Al,In)N, and combinations thereof. Quaternary alloys of the above may also be employed.

Substrate 2 also can include a supplemental element such as C, H, N, Li, Na, K, Mg, Ca, Sr, Ba, Bi, B, Al, P, S, O, and the like in an amount typically less than an amount of the semiconductor. In an embodiment, substrate 2 includes silicon, and the silicon is optionally doped. According to an embodiment, the semiconductor is an intrinsic semiconductor or an extrinsic semiconductor doped with a selected dopant, e.g., a p-dopant or an n-dopant. In one embodiment, the substrate includes a p-dopant. In another embodiment, substrate 2 includes an n-dopant. In a particular embodiment, substrate 2 is p-doped Si. In one embodiment, substrate 2 is n-doped Si. Substrate 2 can be produced from, e.g., commercially available semiconductor grade p-doped Si having a particular crystalline orientation, e.g., having Miller indices <111>, <100>, and the like. Substrate 2 can be amorphous, polycrystalline, or a single crystal. In an embodiment, substrate 2 has a stacked structure that includes a plurality of semiconductor layers such as by forming films as SiGe/Si/SiGe/Si on a Si substrate. In some embodiments, substrate 2 includes crystalline domains among amorphous material.

In another embodiment, substrate 2 includes a glass, Pyrex, sapphire, polymer, ceramic, or an electrically conductive material, e.g., a metal. The substrate can be electrically conductive, semiconductive, or electrically insulating.

A thermal conductance of substrate 2 can be selected by choice of a composition of substrate 2 as well as a geometrical shape or size of substrate 2.

A dielectric layer can be disposed on substrate 2 to generally isolate substrate 6 from, e.g., contamination or deterioration during formation of optical resonator 4. In an embodiment, the dielectric layer electrically insulates substrate 2 from thermal member 10. The dielectric layer can include an oxide of an element in substrate 2 or independently can be an oxide of a semiconductor material such as $SiO_2$. According to an embodiment, the dielectric layer is an oxide such as an oxide that includes an element from substrate 2, e.g., an oxide of the semiconductor (also referred to herein as a semiconductor oxide). In an embodiment, substrate 2 includes Si, and dielectric layer 28 includes silicon dioxide ($SiO_2$). Additional dielectric layer materials include gallium oxide ($GaO_3$), aluminum oxide ($Al_2O_3$), or alloys thereof, oxides of compounds from Groups III and V or alloys thereof, and the like. Exemplary oxides in the dielectric layer also include ZnO, $HfO_2$, $SnO_2$, $In_2O_3$, $Zn_2SnO_4$, $Ga_2O_3$, $Al_2O_3$, and the like. In an embodiment, the dielectric layer is a product of oxidation of a portion of substrate 2 to produce the semiconductor oxide. According to one embodiment, the oxide is a product of rapid thermal oxidation of substrate 2 so that the oxide (the dielectric layer) is derived from substrate 2. In another embodiment, the oxide is a product of low temperature oxidation of substrate 2 to produce an oxide. In a further embodiment, the oxide is a product of depositing the oxide on substrate 2, which may or may not involve oxidation of substrate 2. In a certain embodiment, the dielectric layer includes $SiO_2$ as the oxide, which is a product of oxidation of substrate 2 that includes Si. In some embodiments, the dielectric layer includes a semiconductor oxide, a ceramic (e.g., $ZrO_2$, $Al_2O_3$, SiC, $Si_3N_4$, BN, $BaTiO_3$, and the like), a glass, a polymer, or a combination thereof. In some embodiments, the dielectric layer includes an organic compound such as a polymer, e.g., cellulose, poly(methyl methacrylate), and the like.

The optical resonator and waveguide independently can be made from a same or different material as the substrate. In some embodiments, the optical resonator includes sapphire, silicon, silica, silicon nitride, aluminum nitride, or a combination thereof. The material for forming the optical resonator can be selected based on a resonant wavelength for the optical resonator, e.g., silicon for devices a resonant frequency in a near infrared region (e.g., up to 2 µm wavelength), silicon nitride or aluminum nitride for a visible wavelength, sapphire for a terahertz wavelength, and the like.

In various embodiments, thermal member 10 includes a metal layer. The metal layer can be disposed on substrate 2, on the dielectric layer, or disposed on substrate 2 and covered by a dielectric layer interposed between thermal member 10 and optical resonator 4. Exemplary conductive materials include a metal such as a transition metal, alkaline earth metal, alkali metal, rare earth metal, metal carbide, metal oxide, metal sulfide, or a combination thereof. Exemplary metals include Zr, Hf, Ti, V, Cr, Mn, Fe, Co, Ni, Cu, Zn, Nb, Mo, Tc, Ru, Rh, Pd, Ag, Cd, Ta, W, Re, Os, Ir, Pt, Au, Li, Na, K, Be, Mg, Ca, Sr, Ba, Gd, and the like. Thermal member 10 can include the metal layer, a non-metal (e.g., graphene, carbon nanotubes, carbon black, and the like), or a combination thereof.

In an embodiment, thermometer is produced by forming the optical resonator (e.g., a ring resonator) on a silicon-on-insulator substrate (SOI). The substrate can include a stacked structure having a first silicon layer (e.g., 220 nm thick) and a buried silicon dioxide layer (BOX, e.g., 2 µm thick) interposed between the first silicon layer and a bottom silicon layer (e.g., 670 µm thick). The SOI can be a wafer or die. A positive or negative tone electron beam resist is spin coated on the SOI substrate and baked at a temperature above a glass transition temperature of the resist. The substrate is subjected to electron beam to provide the optical resonator. During development of the resist from an exposed resist (e.g., the positive tone electron beam resist) or an unexposed resist (e.g., the negative tone electron beam resist), portions of the first silicon layer are removed by a solvent post lithography to form an etch mask. The resulting structure is subjected to dry etching by, e.g., an inductively coupled plasma reactive ion etch where an unmasked portion of the first silicon layer is etched through to the BOX layer. The etch mask is dissolved in a solvent to provide the thermometer. In some embodiment, the dielectric layer (e.g., silicon dioxide) is disposed on the thermometer by plasma-enhanced chemical vapor deposition to provide, e.g., a 2 µm thick silicon dioxide dielectric layer.

According to an embodiment, the Bragg grating or Bragg coupler can be formed by irradiating the optical resonator or the waveguide with an ultraviolet light (e.g., from an ultraviolet laser such as ArF or KrF) to modify an index of refraction of the illuminated material. An angle between an ultraviolet light beam and optical resonator (or waveguide) can determine a period of protrusions and depressions of the Bragg grating or coupler and thus the Bragg wavelength. A plurality of ultraviolet laser beams can be used to create a periodic phase mask (photomask) in a phase mask technique, e.g., by using two first-order diffracted ultraviolet laser beams. A non-periodic phase mask can be used to obtain other patterns of the Bragg grating or coupling. In another embodiment, a point-by-point Bragg grating or coupler is created by point-by-point writing a pattern with a focused laser beam. In some embodiments, an infrared light having intense femtosecond pulses is used to produce the Bragg grating or coupler.

According to an embodiment Bragg grating is fabricated on a silicon-on-insulator substrate (SOI) that includes the topmost silicon layer (e.g. 220 nm thick), thick buried silicon dioxide layer (BOX) e.g. 3 μm thick, and the supporting bottom silicon layer (e.g. 670 μm thick). The SOI can be wafer or die. A positive or negative tone electron beam resist is spin coated on the SOI substrate, and the resultant structure is baked at a temperature greater than a glass transition temperature of the resist. The substrate is subjected to electron beam exposure to provide the Bragg grating. Electron beam lithography defines the structure of Bragg grating and is an etch mask. A subsequent dry etch process such an inductively coupled plasma reactive ion etch where an unmasked portion of the first silicon layer is etched through to the BOX layer. The etch mask is dissolved in a solvent to provide the thermometer. In some embodiments, the dielectric layer (e.g., silicon dioxide) is disposed on the thermometer by plasma-enhanced chemical vapor deposition to provide, e.g., a 2 μm thick silicon dioxide dielectric layer.

A physical size or material of the thermometer is selected based on a wavelength range of the input light, output light, or resonant frequency of the optical resonator. The optical resonator can have an outer diameter from 9 μm to 900 μm, specifically 9 μm to 700 μm, and more specifically from 9 μm to 150 μm. A distance between the optical resonator and the waveguide can be less than or equal to 300 nm, specifically 10 μm to 200 μm, and more specifically from 20 nm to 150 nm.

In an embodiment, the thermometer is configured to measure a temperature from 300 milliKelvin (mK) to 500 K, specifically 300 mK to 450 K, and more specifically 300 mK to 325 K. According to an embodiment, the thermometer is configured to measure a temperature, wherein an uncertainty in a measured temperature is less than or equal to 10 mK. In certain embodiments, the thermometer has a temperature resolution greater than or equal to 1 mK. The thermometer has a temperature-dependent shift in a resonance wavelength from 1 picometers per Kelvin (pm/K) to 150 pm/K. According to an embodiment, for resolving a temperature difference, the thermometer has a resolution greater than or equal to 1 mK (i.e., the thermometer resolves a temperature difference of at least 1 mK), specifically greater than or equal to 80 μK, and more specifically greater than or equal to 10 μK.

The thermometer has advantageous optical properties. In an embodiment, the input light to the thermometer includes a wavelength from 200 nm to 10 μm, specifically 400 nm to 3 μm, and more specifically 500 nm to 2 μm. The resonant frequency of the optical resonator includes a wavelength from 200 nm to 10 μm, specifically 400 nm to 3 μm, and more specifically 500 nm to 2 μm. The output light of the thermometer includes a reduced transmission of the resonant frequency with respect to the input light. A free spectral range of the optical resonator is greater than 0.001 nm and specifically from 0.1 nm to 20 nm. A bandwidth of the optical resonator is from 0.0001 nm to 1 nm. A quality factor (Q-factor) of the optical resonator is from 1 to $10^6$ and specifically from 100 to 100,000. It is contemplated that the optical resonator can have an increased Q-factor by including a Bragg reflector.

In an embodiment, a group index is from 1 to 5, specifically from 1.5 to 4.7. The thermometer operates over a wide range of input light power provided the resonant wavelength can be communicated from the waveguide to the optical resonator. Moreover, the power can be as large as a damage threshold of the optical resonator or waveguide, e.g., greater than or equal 10 microwatts (μW), specifically greater than 20 μW, and more specifically 50 μW up to the damage threshold.

The thermometer has numerous advantages and benefits. The thermometer is useful to detect a temperature with a sub-mK resolution. The thermometer has a low noise level and low thermal mass. Moreover, the thermometer is substantially unaffected by electromagnetic interference and has applications wherever a thermometer can be used provided light can be coupled into the thermometer with transmission from the waveguide to the optical resonator. Exemplary areas of application include, but are not limited to, medicine, aerospace, analytical instrumentation, microfluidic, and the like.

The thermometer leverages frequency metrology to achieve mechanical and environmental stability. A silicon-based thermometer that includes the optical resonator resolves temperature differences of 1 mK using, e.g., by scanning the input wavelength over the resonant frequency of the optical resonator, and a noise floor of 80 μK or better is achieved for measuring a temperature difference, e.g., by using a side-of-fringe method where constant power input light is incident at the waveguide as discussed below.

Additionally, while certain conventional thermometers such as a platinum resistance thermometer is sensitive to mechanical shock, the thermometer herein has a response that is substantially independent of mechanical shock such that the thermometer is configured to operate stably in a presence of a perturbing vibration and can be disposed on a plurality of actively vibrating articles, e.g., airplanes, satellites, automobiles, buildings, shoes, and the like. Moreover, the thermometer can be inexpensively manufactured compared to many current commercially available thermometers.

The thermometer beneficially includes an optical resonator that has a periodic notch filter-like thermal response where the resonant wavelength shows a temperature-dependent change due to thermal expansion or thermo-optic effect.

Advantageously, a resonance frequency of the thermometer does not vary over a wide range of relative humidity levels, e.g., a relative humidity greater than 17 percent relative humidity (% RH), and more specifically 26% RH, based on amount of water vapor in a gas surrounding the optical resonator. As such, a change in resonance frequency is due to a temperature change, which does not depend on a change in humidity of an environment in which the thermometer is disposed.

The thermometer has numerous uses. In an embodiment, the thermometer has a temperature response such that the output light from the waveguide depends on a temperature of the optical resonator. For the optical resonator that includes the ring resonator, a change in the resonant frequency (corresponding to resonant wavelength $\lambda_r$) arises from a change in refractive index (n) of the optical resonator or a change of a physical dimension of the optical resonator that occurs in response to a change in temperature of the optical resonator. The resonance wavelength $\lambda_r$ for a mode number (m) of a ring resonator is $\lambda_r(m)=[\text{neff}(\lambda,T_r)\times L(T_r)]/m$, where $\lambda$ is a vacuum wavelength; neff is an effective refractive index of the ring resonator; m is a mode number; L is a ring perimeter; and $T_r$ is a temperature of the optical resonator. A change in the resonant wavelength of the optical resonator is given by formula (1)

$$\Delta\lambda_r = \Delta T_r \lambda_r \left( \frac{\frac{\partial n_{\text{eff}}}{\partial T_r} + n_{\text{eff}} \frac{\partial L}{\partial T_r} \frac{1}{L}}{n_g} \right)$$

where group index $n_g$ is given by $$n_g = n_{\text{eff}} - \lambda_r \frac{\partial n_{\text{eff}}}{\partial \lambda_r}$$

Figure 14A:
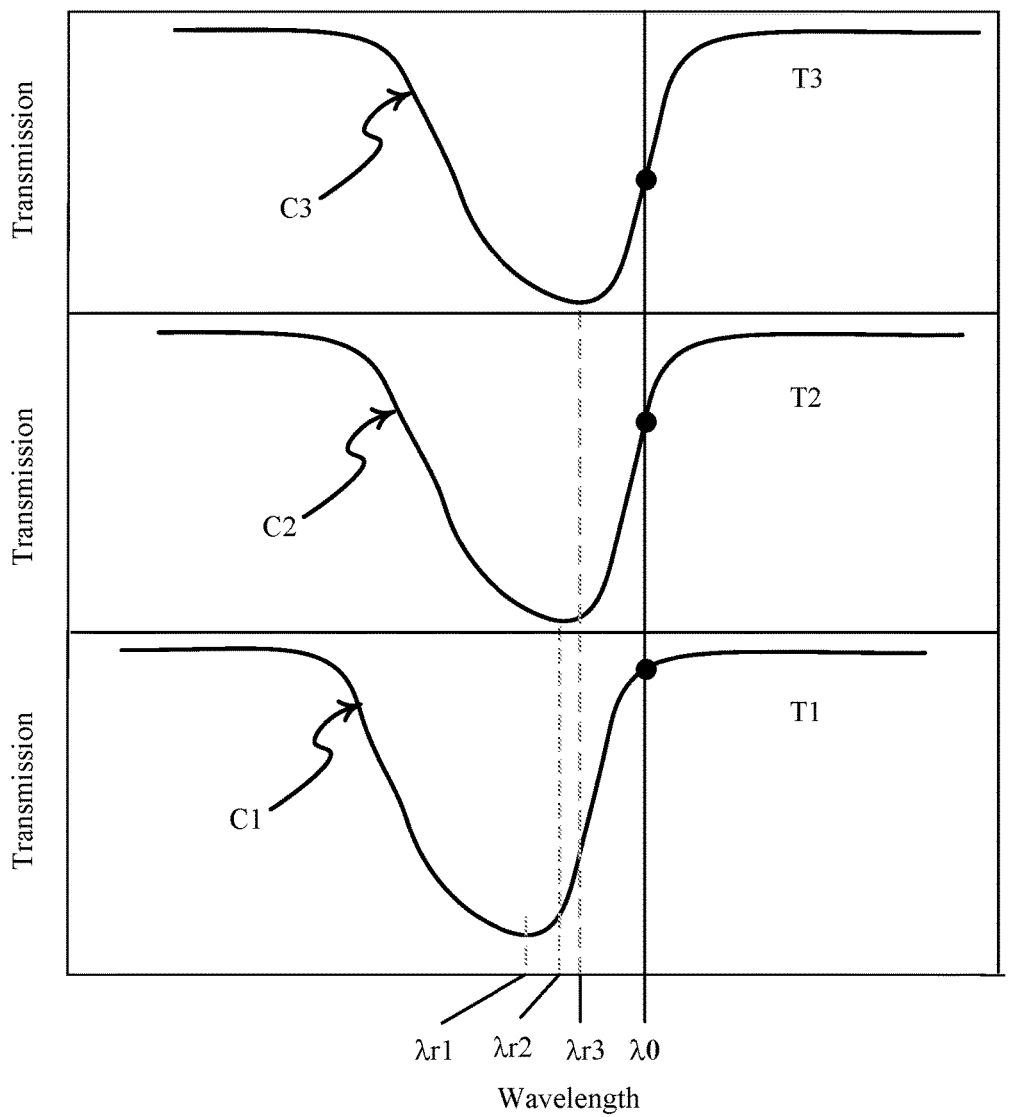
FIG. 14A shows a graph of transmission versus wavelength for a plurality of temperatures.
Figure 14B:
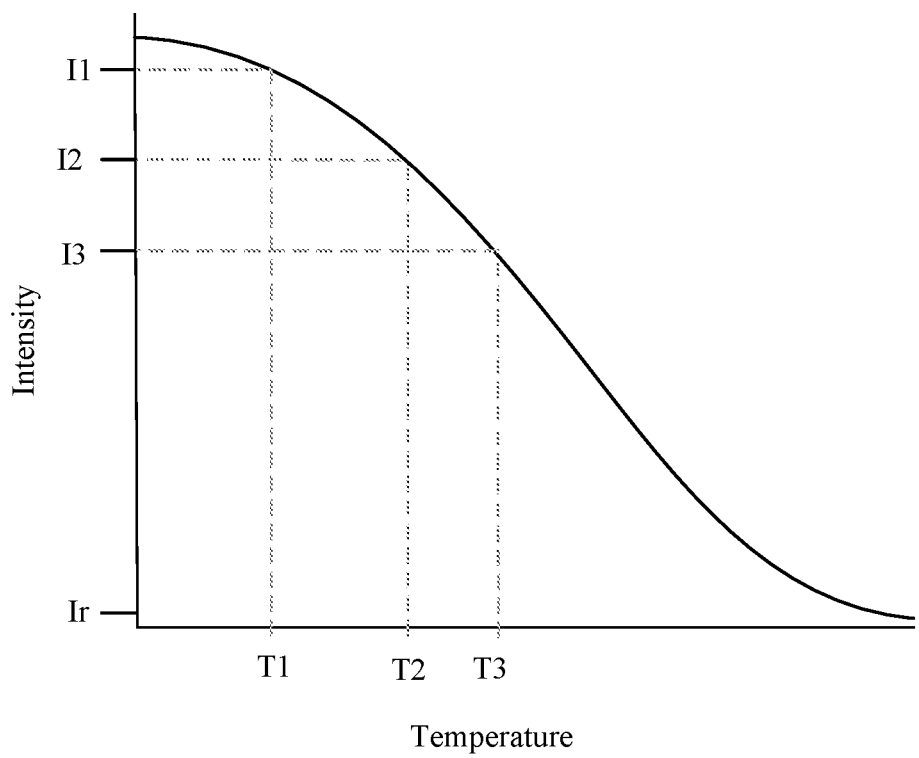
FIG. 14B shows a graph of intensity versus temperature.

With reference to FIG. 14A, in an embodiment, a process for acquiring a temperature from the thermometer includes providing the thermometer that includes the optical resonator and that has first transmission curve C1 at first temperature T1, second transmission curve C2 at second temperature T2, and third transmission curve C3 at third temperature T3. The optical resonator has first resonant wavelength $\lambda r1$ at first temperature T1, second resonant wavelength $\lambda r2$ at second temperature T2, third resonant wavelength $\lambda r3$ at third temperature T3. The input light at wavelength $\lambda 0$ is provided to the waveguide and transmission of the output light at wavelength $\lambda 0$ is detected as the thermometer is subjected to a temperature change that includes first temperature T1, second temperature T2, and third temperature T3. In this manner, the output light detected at wavelength establishes an intensity curve as shown in FIG. 14B for a graph of intensity versus temperature of the thermometer. Here, the output has first transmission intensity I1, second transmission intensity I2, third transmission intensity I3 respectively at first temperature T1, second temperature T2, and third temperature T3.

Figure 14C:
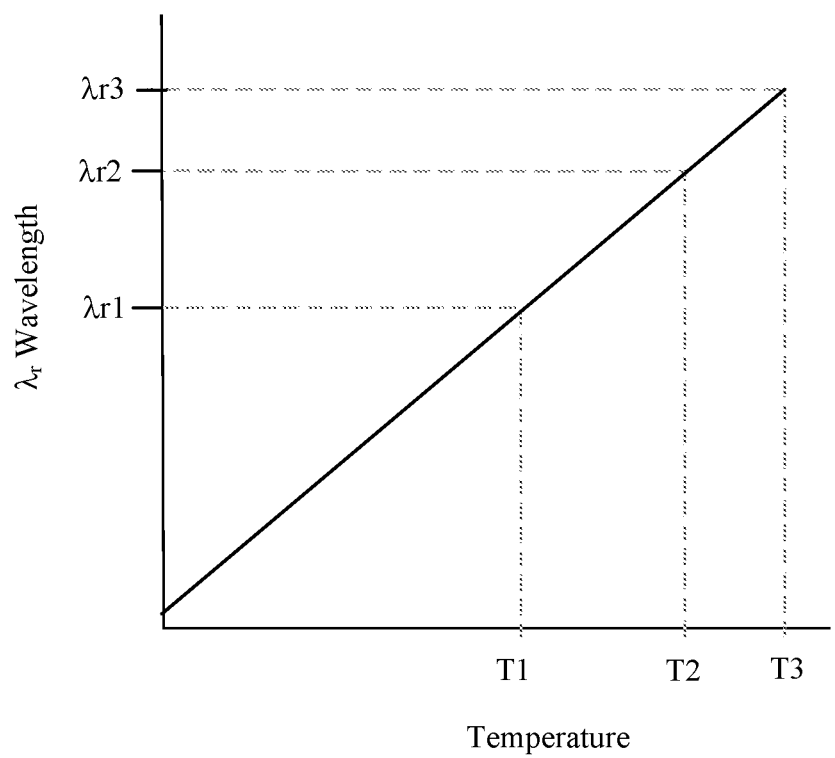
FIG. 14C shows a graph of resonant wavelength versus temperature.

Furthermore, first resonant wavelength $\lambda r1$ at first temperature T1, second resonant wavelength $\lambda r2$ at second temperature T2, third resonant wavelength $\lambda r3$ at third temperature T3 can be detected using a detector, e.g., a wavemeter. Such results are shown in FIG. 14C for a graph of resonant wavelength versus temperature. Information in the graph shown in FIG. 14C and knowledge of intensity data provides determination of an unknown temperature of temperature change of the thermometer. According to an embodiment, a process for determining an unknown temperature or change in temperature includes detecting an intensity of output light at a wavelength and comparing an intensity of output light at the wavelength to an intensity curve to determine the temperature, temperature change, or combination thereof.

According to an embodiment, the thermometer includes the thermal member to change a temperature of the thermometer by providing a controlled and defined heat source to the thermometer, e.g., the optical resonator. The change in resonant frequency of the optical resonator is measured and a transmission response of output light is detected to determine if the thermometer is responding as expected based on either a theoretical response curve or a calibration curve for the thermometer.

In an embodiment, a process for determining a thermal property includes providing a thermometer that includes a substrate, an optical resonator disposed on the substrate and comprising an optical resonance and a waveguide disposed on the substrate proximate to the optical resonator. The process also includes subjecting the optical resonator to a first temperature, receiving (by the waveguide) an input light comprising a wavelength having a first transmission intensity through the waveguide at the first temperature, receiving (by the optical resonator from the waveguide) a first amount of the wavelength at the first temperature, subjecting the optical resonator to a second temperature, receiving (by the optical resonator from the waveguide) a second amount of the wavelength at the second temperature, changing the first transmission intensity to a second transmission intensity corresponding to the second amount, and analyzing the first transmission intensity and the second transmission intensity to determine the thermal property that includes the first temperature, the second temperature, a difference between the first temperature and the second temperature, or a combination comprising at least one of the foregoing.

According to an embodiment, the further includes subjecting the optical resonator to a temperature change that includes the first temperature and the second temperature by applying an amount of electrical power to a thermal member disposed on the substrate to achieve the first temperature, the second temperature, or a combination comprising at least one of the foregoing; and comparing a change in the first transmission intensity and the second transmission intensity, the difference between the first temperature and the second temperature, or a combination comprising at least one of the foregoing to a reference value for the amount of electrical power.

Figure 15:
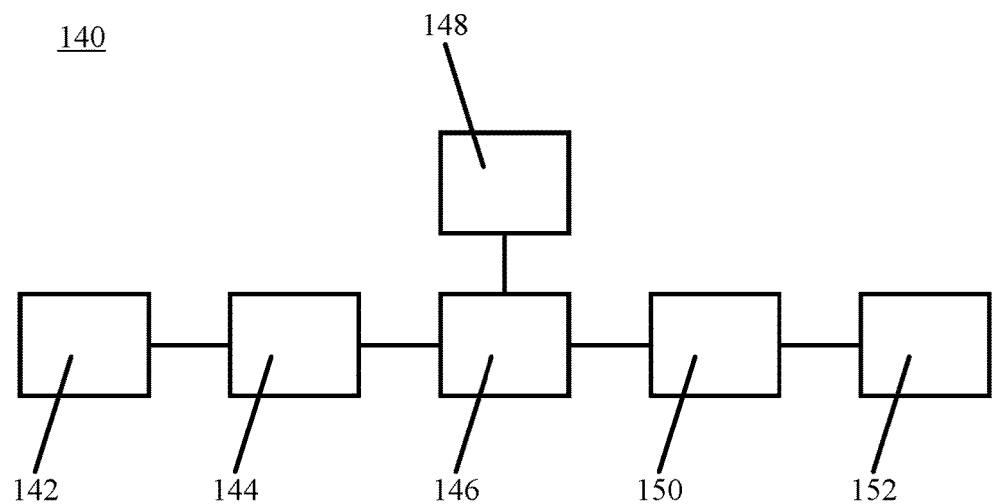
FIG. 15 shows a thermometer system.

In an embodiment, with reference to FIG. 15, thermometer system 140 includes light source 142 to provide input light to thermometer 150. Light source 142 is a broad band source (e.g., a lamp), a laser, or a combination thereof. Optical filter 144 (e.g., a Fabry-Perot cavity) is optionally disposed in a path of the input light to select a narrow bandwidth of input light to be communicated to thermometer 150. Beam splitter 146 is optionally used to provide a portion of the input light to first detector 148, e.g., a wavemeter to measure the wavelength of the input light, a photodiode, a power meter, and the like. It is contemplated that a wavelength of the input is measured using, e.g., a wavemeter, an etalon, a spectrometer, a wavelength cell, a spectrum analyzer, and the like. Output light from thermometer 150 is sent to second detector 152, which is, e.g., a light detector such as a photodiode, charge coupled device, semiconductor detector (e.g., InGaAs), photomultiplier tube, and the like.

Figure 16:
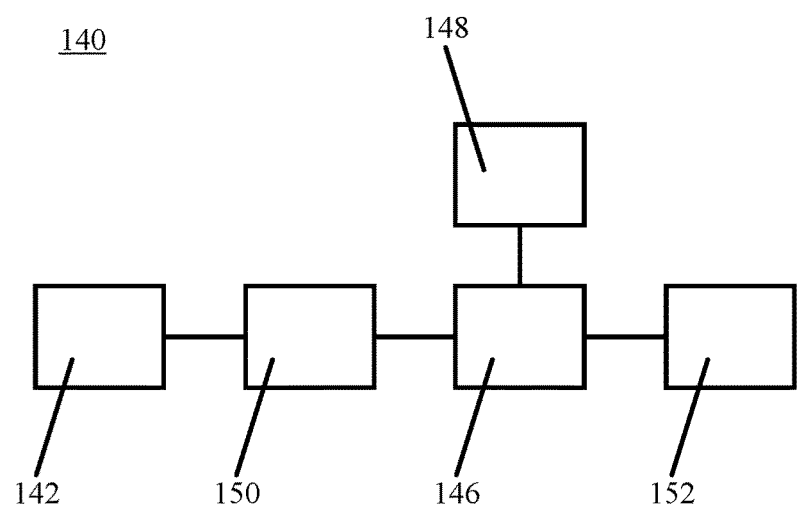
FIG. 16 shows a thermometer system.

According to an embodiment, with reference to FIG. 16, thermometer system1 140 includes thermometer 146 having an add-drop arrangement of an optical resonator and waveguides. Here, optional optical filter 144 is absent due to the self-filtering behavior of an auxiliary waveguide in combination with the optical resonator.

Figure 17:
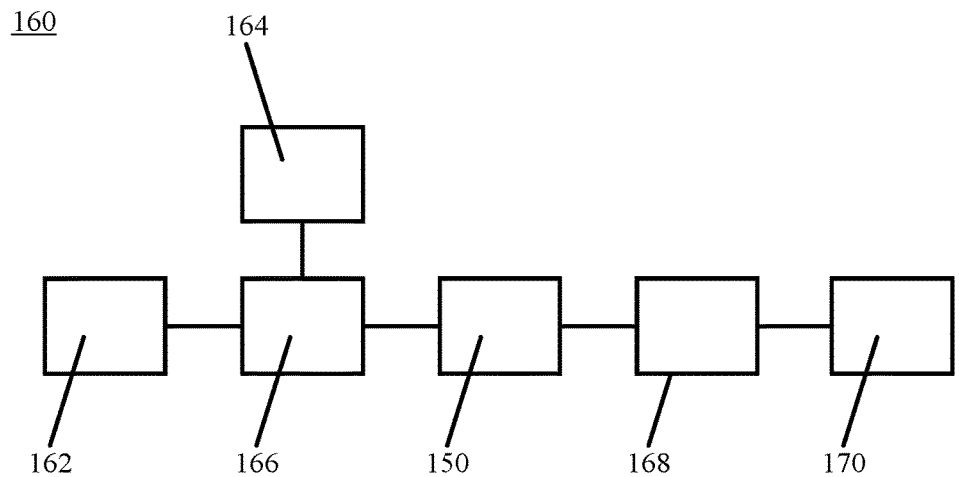
FIG. 17 shows a thermometer system.

In an embodiment, with reference to FIG. 17, thermometer system1 140 includes thermometer 150 to receive input light from first light source 162 (e.g., a read out laser) or second light source 164 (e.g., a cooling laser) via combiner 166 (e.g., a multiplexer or lock-in amplifier). Output light from thermometer 150 is directed to optical amplifier 168 and detected by detector 170 (e.g., a spectrum analyzer). Here, the side bands of second light source 164 are detected, and a ratio of an area of a side band or intensity is determined to calculate phonon occupancy, which is used in a Boltzmann's law calculation to provide temperature of the thermometer.

Figure 18:
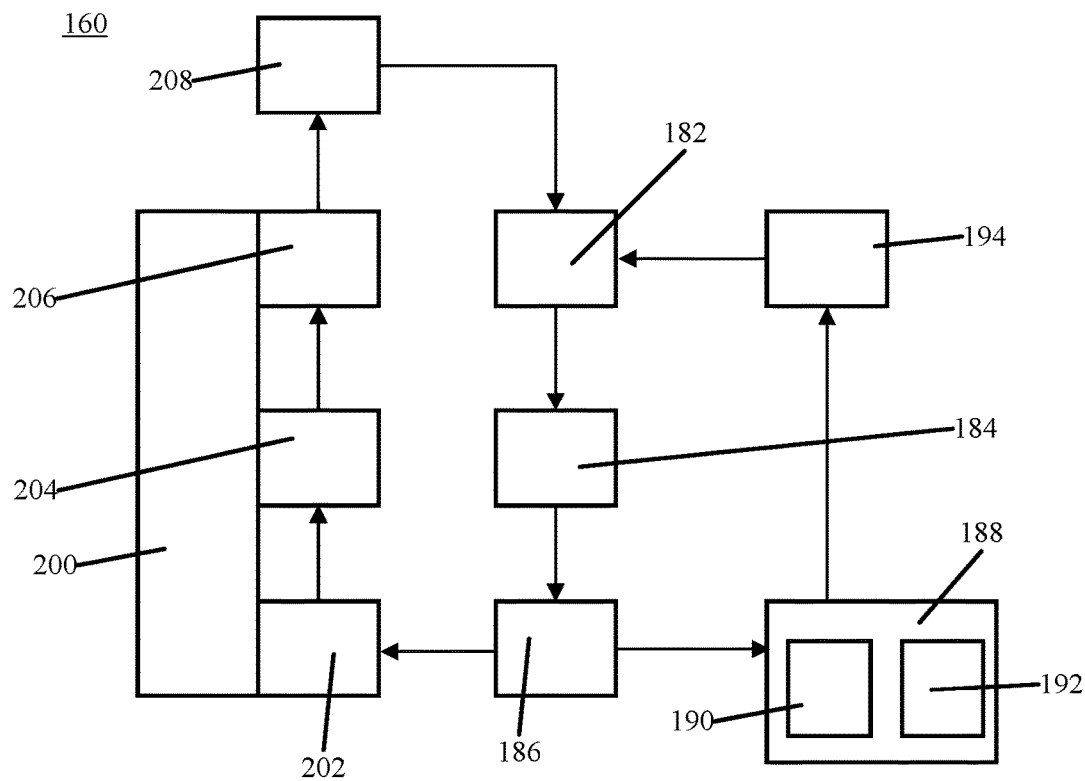
FIG. 18 shows a system to detect temperature of an article.

According to an embodiment, with reference to FIG. 18, thermometer system 180 includes controller 182 (e.g., a microprocessor, computer, and the like) in communication with light source 184 that provides input light to splitter 186 and control thermometer 188, including a plurality of thermometers, e.g., first thermometer 190 and second thermometer 192 to provide a thermal calibration response for control thermometer 184. Output light from control thermometer 184 is sent to first detector 194 whose output signal is communicated to controller 182. A plurality of test thermometers (including the thermometer herein), e.g., first test thermometer 202, second test thermometer 204, and third test thermometer 206 are disposed in thermal contact with article 200 (e.g., airplane, automobile, surgical patient, desk clock, aquarium, and the like), and input light from beam splitter 186 is directed in series (or parallel) to first test thermometer 202, second test thermometer 204, and third test thermometer 206, which provide output light to second detector 208. An output signal is directed to the controller 182. Output signals from test thermometers (202, 204, 206) can be compared to reference signals from control thermometer 188.

In some embodiments, the thermometer is a self-diagnosing thermometer that includes a thermal member such that the thermometer is remotely interrogated after installation in an article. Here, the thermal member provides a known heat load to the optical resonator and output light is collected to determine if a change in the resonant frequency has occurred with respect to an expected value of change in the resonant frequency for the known heat load.

According to an embodiment, a process for self-diagnosing a thermometer includes disposing a thermal member proximate to an optical resonator of the thermometer, providing an input light to the waveguide, detecting output light from the waveguide, and measuring transmission intensity. The thermometer is at a first temperature, and a wavelength of the input light is changed such that the wavelength is swept over the resonance frequency of the optical resonator. The resonance frequency is determined. The process also includes providing an amount of electrical power to the thermal member, changing the temperature of the optical resonator, and changing the wavelength of the input light, wherein a wavelength range includes the resonance frequency. The resonance frequency is determined by detecting from the output light. In an embodiment, a plurality of heating events delivers a plurality of different amounts of electrical power to the thermal member. For a single measurement, a change in resonance frequency provides a change in the resonant frequency corresponding to a first temperature and a second temperature. For the plurality of heating events, the process also includes determining whether a change in the resonance frequency is linear with respect to a change in temperature. In an embodiment, an alert signal is communicated, e.g., to a user, in response to the change in resonant frequency being nonlinear with respect to temperature change. Such nonlinear behavior may be associated with operation of the thermometer in a non-calibrated fashion. Thus, the self-diagnosing behavior of the thermometer provides a way to perform a self-check service by a user or an automatic drive (e.g., an electronic controller such as programmed computer) to determine if the thermometer is performing within an acceptable parameter.

According to an embodiment, the thermometer is subjected to temperature-wavelength calibration to determine the response (e.g., a wavelength shift) determined at a plurality of temperatures that includes an operation temperature. A mathematical function (e.g., a polynomial) is fit to calibration data to create a conversion for a measured resonant wavelength (or wavelength shift) to a temperature.

In an embodiment, a process for self-calibrating a thermometer includes providing a thermometer (including a waveguide and optical resonator disposed on a substrate), determining the resonant frequency of the optical resonator, and providing a stable input light tuned to a longer wavelength side of the resonant frequency to cool the resonator (e.g., a detuned laser). A spectrum analyzer can be used to determine the frequency and intensity of the output light. Under a laser cooling condition, the spectrum analyzer displays a signal corresponding to the wavelength of the detuned laser (e.g., a frequency and intensity) and a plurality (e.g., two) side bands that occur, e.g., equidistantly from the detuned laser frequency. The self-calibration process further includes determining an area of each side band and determining phonon occupancy number P. Phonon occupancy number P is determined from the data by using a phonon occupancy equation such as $P=1/[(A(LF)/A(HF))-1]$, where P is the phonon occupancy number; $A(LF)$ is an area of a low frequency side band, and $A(HF)$ is an area of a high frequency side band. The temperature of the optical resonator is determined from phonon occupancy number P by applying Boltzmann's law. In a particular embodiment, a thermodynamic temperature is determined from phonon occupancy number P to eliminate a temperature artifact such as a triple point water such as that used in temperature standards, e.g., the International Temperature Scale of 1990 (ITS-90), to approximate a thermodynamic temperature.

The apparatus and process herein are further illustrated by the following examples, which are non-limiting.

EXAMPLES

Example 1. Thermometer

A thermometer was fabricated using CMOS techniques on a silicon on insulator (SOI) wafer with a 220 nm thick layer of silicon on top of a 2 µm thick buried oxide layer that isolates an optical mode and prevents loss to the substrate. The fabrication of silicon devices was performed through microfabrication and nanofabrication. Masks were made using ultraviolet light at 193 nm for photolithography and were etched to from a waveguide and Bragg coupler. The Bragg coupler provided free space coupling of light in or out of the thermometer at, e.g., 4 dB per Bragg coupler. The thermometer was subjected to thermal oxidation to form a 10 nm thick $SiO_2$ layer thereon to reduce a surface roughness.

Figure 19:
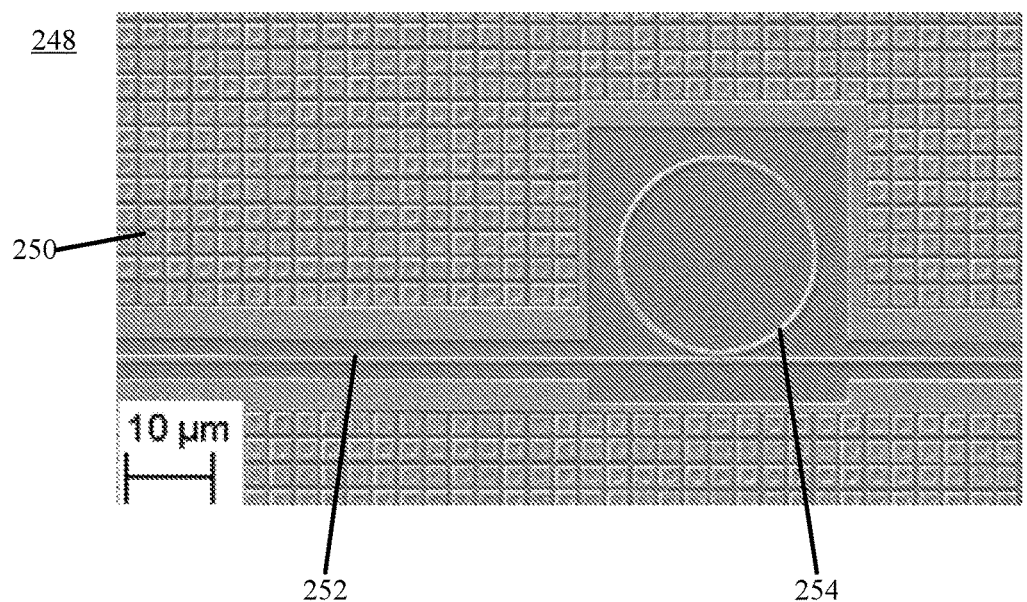
FIG. 19 shows a micrograph of a thermometer according to Example 1.

FIG. 19 shows a micrograph of the thermometer 248 that included ring resonator 254 and waveguide 252. The micrograph was acquired a scanning electron microscope. Ring resonator 254 had 10 µm radius and was separated from waveguide 252 by 130 nm. The thermometer had a free spectral range of 9.2 nm at 1550 nm, Q-factor of 52000, and estimated group index of 4.2.

Example 2. Temperature Response of Thermometer

The thermometer from Example 1 was subjected to thermal response testing. A tunable laser provided input light to the ring resonator. A portion of the input light was picked up from the laser output for wavelength monitoring while the balance of the input light, after passing through the thermometer, was detected by a power meter. The thermometer was mounted on a two-axis stage in a two-stage temperature-controlled enclosure. Input from a platinum resistance thermometer from each stage was fed to an input channel of a proportional-integral-derivative controller that drove a thermoelectric cooler. The first stage minimizes global temperature fluctuations inside the enclosure to ±1 K, and the second stage minimized temperature variations at the thermometer to less than 17 mK over 24 hours. A relative humidity (% RH) inside the enclosure was monitored by a humidity meter. Relative humidity levels were changed inside the enclosure by varying a flow rate of air saturated with water.

The wavelength of the input light from the laser was scanned, and the transmission spectrum was recorded. A center frequency of the transmission spectrum was determined. From a calibration curve, the center frequency was converted to temperature. Thereafter, the temperature of the thermometer was changed from 288 K and 306 K.

Figure 20:
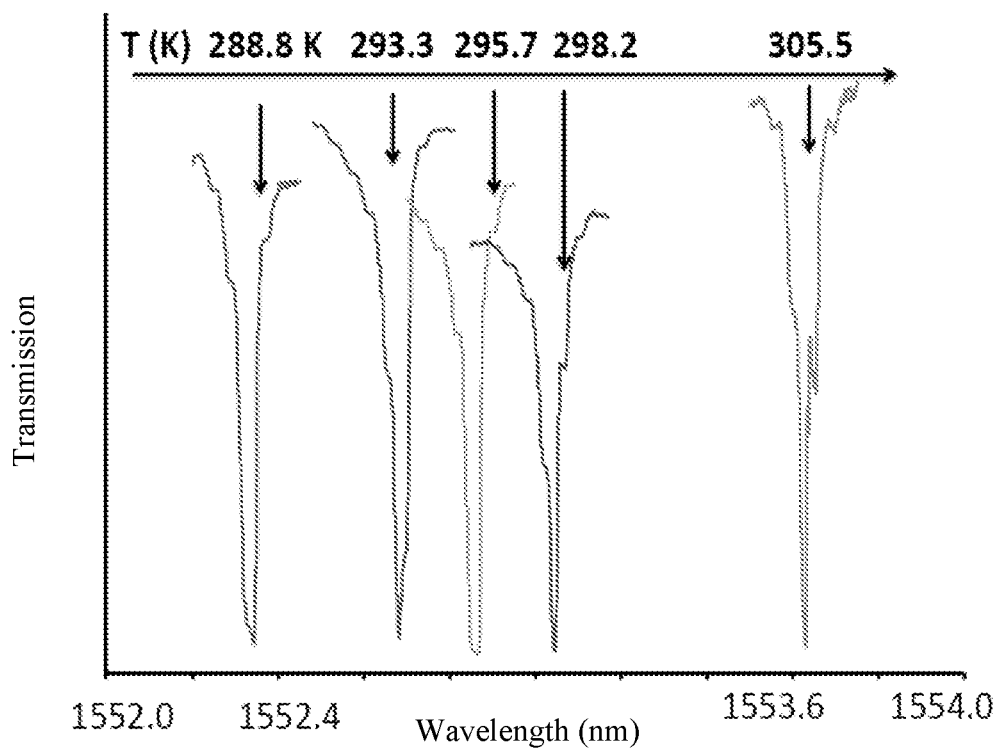
FIG. 20 shows a graph of transmission versus wavelength at a plurality of temperatures according to Example 2.
Figure 23:
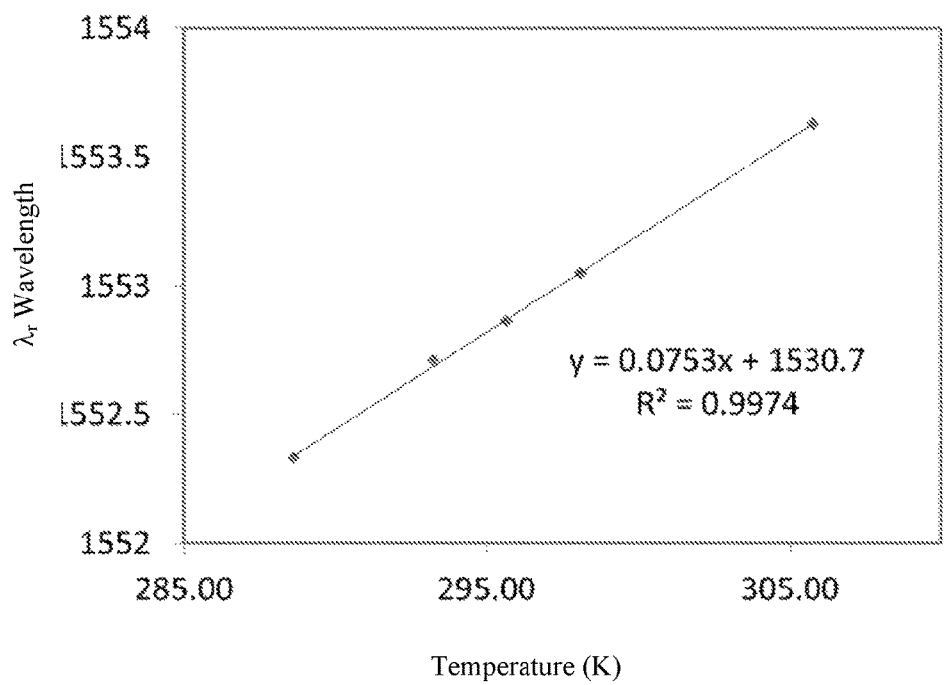
FIG. 23 shows a graph of wavelength versus temperature according to Example 4.

As shown in FIG. 20, the thermometer had a resonant frequency that changed with temperature at 77 pm/K, and the thermometer resolved a temperature difference of 1 mK. FIG. 23 shows a graph of resonance wavelength versus temperature for the thermometer.

Figure 21:
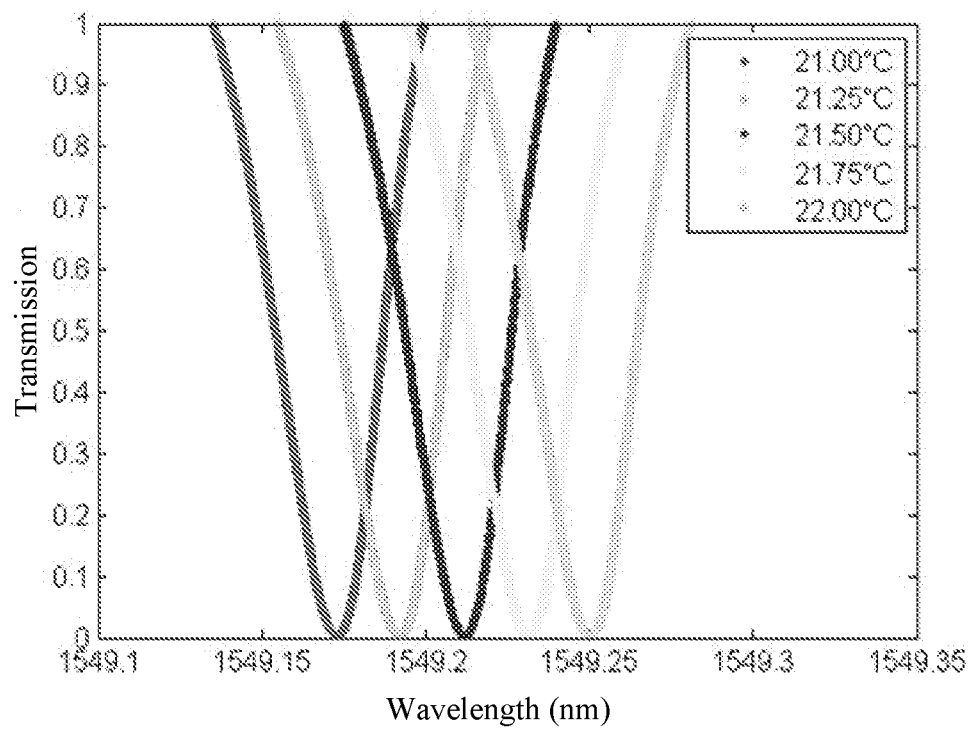
FIG. 21 shows a graph of normalized transmission versus wavelength at a plurality of temperatures according to Example 2.
Figure 22:
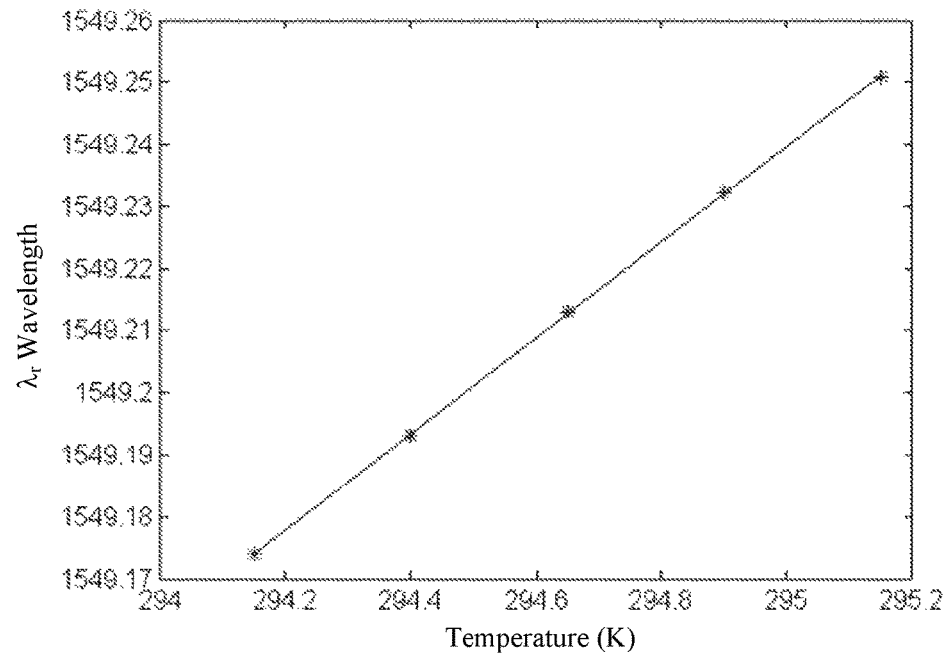
FIG. 22 shows a graph of wavelength versus temperature according to Example 3.

A second thermometer having a ring resonator with a radius of 11 µm was prepared per Example 1 and subjected to testing. For the second thermometer, a graph of transmission versus wavelength is shown in FIG. 21 with a graph of resonance wavelength versus temperature being shown in FIG. 21.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A thermometer comprising:
    a substrate;
    an optical resonator disposed on the substrate and comprising an optical resonance, the optical resonator being configured to receive a resonant frequency corresponding to the optical resonance; and
    a waveguide comprising an aperture disposed on the substrate proximate to the optical resonator to receive input light, to communicate the resonant frequency to the optical resonator, and to transmit output light;
    wherein the aperture is interposed between:
        the substrate and the optical resonator,
        the substrate and the waveguide, or
        a combination comprising at least one of the foregoing, and
        the thermometer is configured to change the optical resonance in response to a change in temperature of the optical resonator.

2. The thermometer of claim 1, further comprising a thermal member disposed on the substrate to change the optical resonance.

3. The thermometer of claim 1, further comprising an auxiliary waveguide disposed on the substrate opposing the waveguide, wherein the optical resonator is interposed between the waveguide and the auxiliary waveguide.

4. The thermometer of claim 1, wherein an aperture is disposed in the waveguide proximate to the resonator.

5. The thermometer of claim 1, wherein the waveguide comprises a Bragg coupler, an end coupler, or a combination comprising at least one of the foregoing disposed at a terminus of the waveguide.

6. The thermometer of claim 1, wherein the optical resonator comprises a ring resonator, a concave disk resonator, a photonic waveguide, disk resonator, a microsphere resonator, a photonic array, or a combination comprising at least one of the foregoing, or a combination comprising at least one of the foregoing.

7. The thermometer of claim 6, wherein the optical resonator is the ring resonator and comprises a substantially uniform width with respect to a radial dimension of the ring resonator.

8. The thermometer of claim 1, wherein the input light comprises a wavelength from 200 nm to 10 µm.

9. The thermometer of claim 1, wherein the resonant frequency comprises a wavelength from 200 nm to 10 µm.

10. The thermometer of claim 1, wherein the output light comprises a reduced transmission of the resonant frequency with respect to the input light.

11. The thermometer of claim 1, wherein a distance between the optical resonator and the waveguide is less than or equal to 300 nm.

12. The thermometer of claim 1, wherein the optical resonator comprises an outer diameter from 9 µm to 900 µm.

13. The thermometer of claim 1, wherein the thermometer is configured to measure a temperature from 300 milliKelvin (mK) to 500 K.

14. The thermometer of claim 1, wherein the thermometer is configured to measure a temperature, wherein an uncertainty in a measured temperature is less than or equal to 10 mK.

15. The thermometer of claim 1, wherein the thermometer has a temperature resolution greater than or equal to 1 mK.

16. The thermometer of claim 1, wherein the thermometer is configured to operate stably in presence of a perturbing vibration.

17. The thermometer of claim 1, wherein the thermometer is configured to self-calibrate, self-diagnose, or a combination comprising at least one of the foregoing.

* * * * *